United States Patent [19]
Ledain et al.

[11] Patent Number: 5,832,515
[45] Date of Patent: Nov. 3, 1998

[54] LOG DEVICE LAYERED TRANSPARENTLY WITHIN A FILESYSTEM PARADIGM

[75] Inventors: Joel E. Ledain, Santa Clara; John A. Colgrove, Palo Alto, both of Calif.; Dan Koren, Incline Village, Nev.

[73] Assignee: Veritas Software, Mt. View, Calif.

[21] Appl. No.: 711,889

[22] Filed: Sep. 12, 1996

[51] Int. Cl.[6] .................................................. G06F 17/30
[52] U.S. Cl. ......................................... 707/202; 395/681
[58] Field of Search ..................................... 395/681, 618, 395/619, 621, 622, 438–441, 497.01, 497.04; 707/202, 203, 205, 206

[56] References Cited

U.S. PATENT DOCUMENTS

| | | | |
|---|---|---|---|
| 5,418,925 | 5/1995 | DeMoss et al. | 395/425 |
| 5,448,719 | 9/1995 | Schultz et al. | 395/182.03 |
| 5,488,701 | 1/1996 | Brady et al. | 395/182.04 |
| 5,530,850 | 6/1996 | Ford et al. | 395/622 |
| 5,537,588 | 7/1996 | Engelmann et al. | 395/618 |
| 5,550,998 | 8/1996 | Willis et al. | 395/441 |
| 5,551,003 | 8/1996 | Mattson et al. | 395/463 |
| 5,555,371 | 9/1996 | Duyanovich et al. | 395/182.11 |
| 5,600,596 | 2/1997 | Shirakihava | 365/189.01 |
| 5,666,114 | 9/1997 | Brodie et al. | 341/50 |
| 5,666,532 | 9/1997 | Saks et al. | 395/621 |

OTHER PUBLICATIONS

Tom Yager, "The Great Little File System," *Byte,* Feb. 1995, 4 pages at http://www.byte.com/art/9502/sec13/art2.htm.

Mike Holton et al., "XFS: A Next Generation Journaled 64–Bit Filesystem With Guaranteed Rate I/O," XFS White Paper, Silicon Graphics, Inc., pp. 1–19, date unknown.

"Write–Only Disk Caches", Jon A. Solworth & Cyril U. Orji, ACM, 1990, pp. 123–132.

"Disk Subsystem Load Balancing: Disk Striping vs. Conventional Data Placement", Ganger, et al., IEEE, 1993, pp. 40–49.

"An Implementation of a Log–Structured File System for UNIX", Staelin, et al., Hewlett Packard, Nov. 30, 1992, 20 pages.

"The Logical Disk: A New Appraoch to Improving File Systems", Jonge, et al., ACM, 1993, pp. 15–28.

"Strategies to Improve I/O Cache Performance", Richardson, et al., IEEE, 1993, pp. 31–39.

(List continued on next page.)

*Primary Examiner*—Paul V. Kulik
*Attorney, Agent, or Firm*—Fliesler, Dubb, Meyer & Lovejoy

[57] ABSTRACT

A log device based data storage subsystem provides for the efficient storage and retrieval of data with respect to an operating system executing on a computer system coupled to the data storage system. The data storage system includes a storage device providing for the storage of predetermined file and system data, as provided by the computer system, within a main filesystem layout established in the storage device. The data storage system also includes a log device coupled in the logical data transfer path between storage device and the computer system. The log device provides for the storage of the predetermined file and system data within a log structured filesystem layout established in the log device. A control program, included as part of the data storage system, is executed in connection with the log device and provides log structured filesystem management over the log device to store the predetermined file and system data in one of a plurality of data segments, delimited by a first free data segment and an oldest filled data segment, to selectively clean the oldest filled data segment to the first free data segment, and to selectively transfer the predetermined file and system data from the log device to the storage device. The control program utilizes location data provided in the predetermined file and system data to identify a destination storage location for the predetermined file and system data within the main filesystem layout.

27 Claims, 5 Drawing Sheets

OTHER PUBLICATIONS

"Understanding Background Data Movement in a Log–Structured Disk Subsystem", Bruce McNutt, IBM Journal of Research and Development, 1994, 8 pages.

"The LFS Storage Manager", Rosenblum, et al., '90 USENIX Technical Conference, Jun., 1990, pp. 1–15.

"The Design and Implementation of a Log–Structured Filed System", Rosenblum, et al., Proceedings of the 13th ACM Symposium on Operating Systems Principles, Jul. 24, 1991, pp. 1–15.

"Beating the I/O Bottleneck: A Case for Log–Structured File Systems", Ousterhout, et al., Computer Science Division, Electrical Engineering & Computer Sciences, University Of California at Berkeley, Oct. 30, 1988, pp. 1–17.

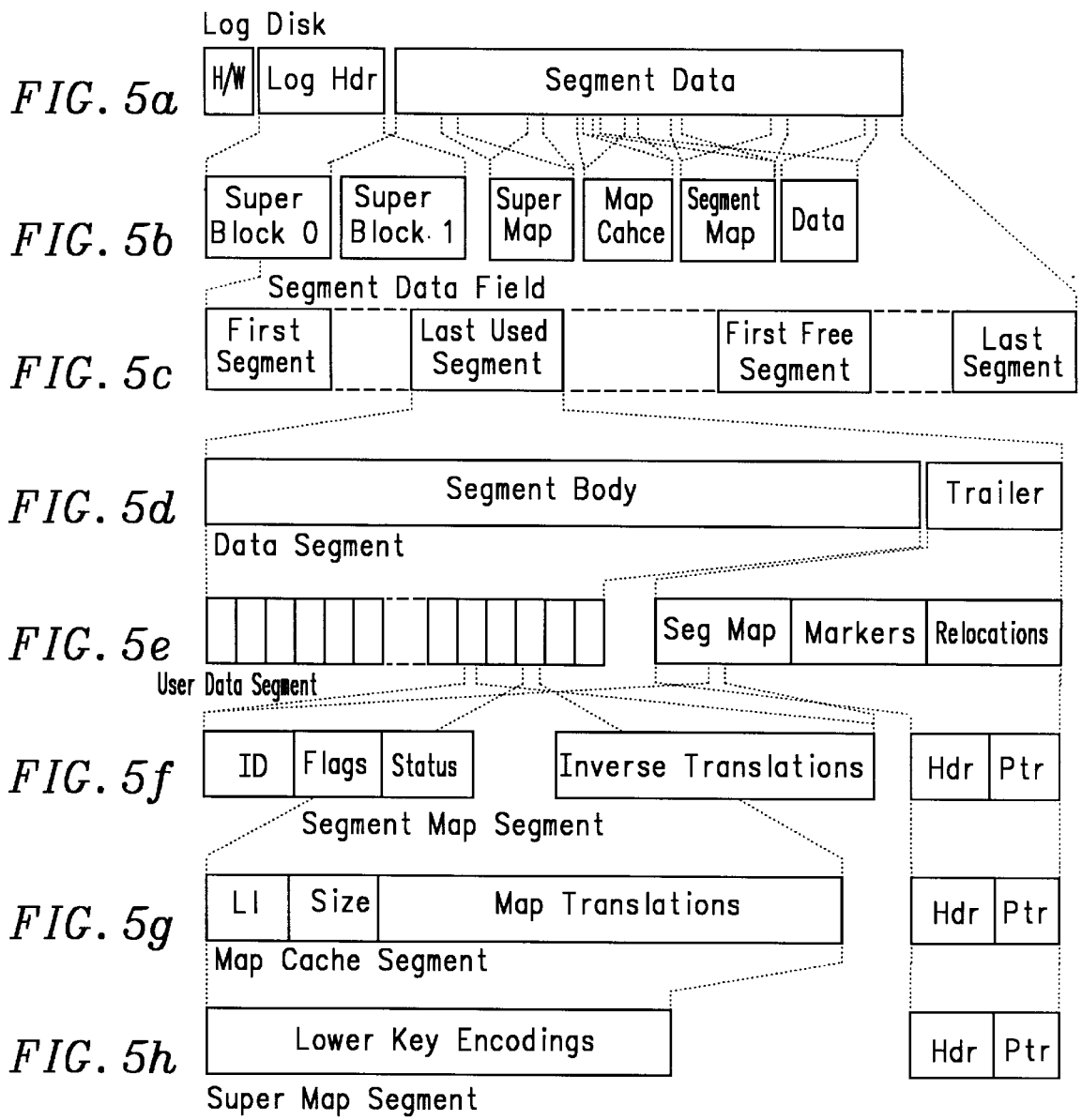

Segment Map

LOG DEVICE LAYERED TRANSPARENTLY WITHIN A FILESYSTEM PARADIGM

BACKGROUND OF THE INVENTION

1. Field of the Invention

The present invention is generally related to high-performance computer filesystem designs used in conjunction with contemporary operating systems and, in particular, to a multi-tasking computer system employing a log device to support a log structured filesystem paradigm over an independent filesystem and the operation of the log device to dynamically balance filesystem I/O transactions.

2. Description of the Related Art

In the operation of conventional computer systems, the overall performance of the system is often constrained by the practically achievable throughput rates of secondary mass storage units, typically implemented variously utilizing single disk drives and cooperatively organized arrays of disk drives. As the peak performance of central processing units has dramatically increased, performance constraints have significantly increased due to the relatively lesser advances in performance achievable by secondary mass storage units. Factors that affect the performance of disk drive type devices include, in particular, the inherent mechanical operation and geometric relations imposed by the fundamental mechanical construction and operation of conventional disk drives. The essentially sequential operating nature of disk drives and the extremely disparate rates of data read/write, actuator seek rates and rotational latencies result in the performance of secondary mass storage devices being highly dependant on the layout and logical organization of data on the physical data storage surfaces of disk drives.

Due to inherent asymmetries in performing read and write disk drive data storage operations, particularly to ensure that physical storage space is correctly allocated and subsequently referenced, a substantial tension exists between optimization of the data layout for data reads and writes. Typically, available physical storage space must be determined from file allocation tables, written to, and then and cataloged in directory entries to perform even basic data writes. A sequence of physical data and directory reads are all that is typically required for data reads.

Another factor that can significantly influence the optimum layout of data is the nature of the software applications executed by the central processing unit at any given time. Different optimizations can be effectively employed depending on whether there is a preponderance of data reads as compared to data writes, whether large or small data block transfers are being performed, and whether physical disk accesses are highly random or substantially sequential. However, the mix of concurrently executing applications in most computer systems is difficult if not practically impossible to manage purely to enforce disk drive operation optimizations. Conventionally, the various trade-offs between different optimizations are statically established when defining the basic parameters of a filesystem layout. Although some filesystem parameters may be changeable without re-installing the filesystem, fundamental filesystem control parameters are not changeable, and certainly not dynamically tunable during active filesystem operation.

An early effort to improve the performance of secondary mass storage devices involved providing a buffer cache within the primary memory of the computer system. Conventional buffer caches are logically established in the file read/write data stream. Repeated file accesses and random accesses of a particular file close in time establish initial image copies of the file contents within the buffer cache. The subsequent references, either for reading or writing, are executed directly against the buffer cache with any file write accesses to the mass storage subsystem delayed subject to a periodic flushing of write data from the buffer cache to secondary mass storage. The buffer cache thus enables many file read and write operations to complete at the speed of main memory accesses while tending to average down the peak access frequency of the physical secondary mass storage devices.

A significant drawback of merely using a buffer cache to improve overall system performance arises in circumstances where data integrity requirements require write data to be written to a non-volatile store before the write access can be deemed complete. In many networked computer system applications, particularly where connectionless communication protocols are utilized for file data transport over the network, the requirement that file write data accesses be completed to non-volatile store is a fundamental requirement of the network protocol itself. Thus, conventionally, the file access latencies incurred in writing data to secondary mass storage devices are a component of and compounded by the latencies associated with data transport over both local and wide area networks.

One approach to minimizing the performance impact of non-volatile storage write requirements has been to establish at least a portion of the buffer cache utilizing non-volatile RAM memory devices. Write data transferred to the buffer cache intended for storage by the secondary mass storage device is preferentially stored in the non-volatile RAM portion of the buffer cache. Once so stored, the file write data request can then be immediately confirmed as succeeding in writing the file data to a non-volatile store.

There are a number of rather significant complexities in utilizing non-volatile RAM buffer caches. The write and read file data streams are typically separated so as to optimize the use of the non-volatile RAM memory for storing write data only. Also, substantial complexities exist under failure conditions where write file data in the non-volatile RAM cache must be cleared to secondary mass storage without reliance on any other information or data beyond what has been preserved in the non-volatile RAM. Even with these complexities, which all must be comprehensively and concurrently handled, the use of a non-volatile RAM store does succeed in again reducing file write access latency to essentially that of non-volatile RAM access speeds.

One particular and practical drawback to the use of non-volatile RAM caches is the rather substantial increased cost and necessarily concomitant limited size of the non-volatile write cache. The establishment of a non-volatile RAM cache either through the use of flash memory chips or conventional static RAM memory subsystems supported with a non-interruptible power supply is relatively expensive as compared to the cost of ordinary dynamic RAM memory. Furthermore, the additional power requirements and physical size of a non-volatile RAM memory unit may present somewhat less significant but nonetheless practical constraints on the total size of the file write non-volatile RAM cache. Consequently, circumstances may exist where the non-volatile write cache, due to its limited size, saturates with file write data requests resulting in degraded response times that is potentially even slower than simply writing file data directly to the secondary mass storage devices.

In order to alleviate some of the limitations of non-volatile RAM caches, disk caches have been proposed. The use of a disk drive for the non-volatile storage of write cached data is significantly more cost effective and capable of supporting substantially larger cache memory sizes than can be realized through the use of non-volatile RAM memories. Although by definition a non-volatile store and capable of being scaled to rather large capacities, disk caches again have file write access times that are several if not many orders of magnitude slower than conventional main memory accesses. Consequently, disk caches are selectively constructed utilizing exceedingly high performance disk drives, resulting in a typically modest improvement in file write access times, but again at significantly increased cost.

In addition to the practical issues associated with using a disk drive as a cache memory, logical data management problems are also encountered. Preferably, the file read data stream is logically routed around the disk cache and supported exclusively through the operation of the RAM buffer cache. File write data bypasses the main memory buffer cache and is written exclusively to the disk cache. Particularly in multi-user a networked computer system environments, multiple independent read and write file accesses may be directed against a single file within a rather small time frame. Since the requests are ultimately associated with potentially independent processes and applications, the computer operating system or at least the subsystem managing the buffer and disk caches must provide a mechanism for preserving data integrity. Write data requests must be continually resolved against prior writes of the same block of file data as stored by the disk cache. Each read of a file data block must be evaluated against all of the data blocks held by the write disk cache. While many different bypass mechanisms and data integrity management algorithms have been developed, the fundamental limitation of a disk cache remains. Repeated accesses to the disk cache are required not only in the ordinary transfer of write file data to the cache but also in management of the cache structure and in continually maintaining the current integrity of the write file data stream. Consequently, the potential performance improvements achievable by a disk cache are further limited in practice.

Significant work has been done in developing new and modified filesystems that tend to permit the optimal use of the available mass storage subsystem read and write data bandwidth. In connection with many conventional filesystems, a substantial portion of the available data access bandwidth of a disk drive based mass storage subsystem is consumed in seeking operations between data directories and potentially fragmented parts of data files. The actual drive bandwidth available for writing new data to the mass storage subsystem can be as low as five to ten percent of the total drive bandwidth. Early approaches to improving write data efficiency include pre-ordering or reordering of seek and write operations to reduce the effective seek length necessary to write a current portion of write stream data. Further optimizations actually encourage the writing of data anywhere on the disk drive recording surfaces consistent with the current position of the write head and the availability of write data space. Directory entries are then scheduled for later update consistent with the minimum seek algorithms of earlier filesystems.

In all of these optimized conventional filesystems, a substantial portion of the disk drive bandwidth is still consumed with seeking operations. Hybrid filesystems have been proposed to further improve bandwidth utilization. These hybrid filesystems typically include a sequential log created as an integral part of the filesystem. The log file is sequentially appended to with all writes of file data and directory information. In writing data to the log structure, only an initial seek is required, if at all, before a continuous sequential transfer of data can be made. Data bandwidth, at least during log write operations, is greatly improved. Whenever the log fills or excess data bandwidth becomes available, the log contents are parsed and transferred to the filesystem proper.

A logging filesystem does not reduce, but likely increases the total number of file seeks that must be performed by the disk drive subsystem. The log itself must be managed to invalidate logically overwritten data blocks and to merge together the product of partial overwrites. In addition, file data reads must continually evaluate the log itself to determine whether more current data resides in the log or the main portion of the filesystem. Consequently, while atomic or block file data writes may be performed quickly with a minimum of seeking, there may actually be a decrease in the overall data transfer bandwidth available from the disk drive due to the new cleaning and increased maintenance operations inherently required to support logging. For these reasons, hybrid logging filesystems, like the earlier disk caches, have not been generally accepted as a cost effective way of improving the overall performance of mass storage subsystems.

A relatively new filesystem architecture, often referred to a log structured filesystem has been proposed and generally implemented as a mechanism for significantly improving the effective data bandwidth available from a disk drive based mass storage subsystem. A log structured filesystem provides for permanent recording of write file data in an effectively continuous sequential log. Since data is intentionally written as received continually to the end of the active log, the effective write data bandwidth rises to approximately that of the data bandwidth of the disk drive mass storage subsystem. All seek operations are minimized as file data is written to the end of the active log. Read data, as well as cleaning and data block maintenance operations, are the main source of seek operations.

Log structured filesystems are generally viewed as particularly cost effective in being able to use the entire drive storage space provided by the mass storage subsystem for the log structure and obviating any possible benefit to using an external disk cache. Unlike the hybrid log filesystems, the log structured filesystem is itself the ultimate destination for all write file data. Since the effective write performance of the resulting log structured filesystem is quite high, there is no benefit for pre-caching write data on one disk drive and then copying the data to another disk drive.

The general acceptance of log structured filesystems for certain, typically write intensive, computer applications reflects the significant improvement available through the use of a direct sequential write log structure filesystem. The available write data bandwidth, even in the presence of continuing log cleaning and maintenance operations, can be near or above 70 percent. In addition, log structured filesystems provides a number of ancillary benefits involving the reduced latency of atomic file data write operations and improved data integrity verification following computer system crashes. Particularly in network support related operations, the direct writing of write file data to a log structured filesystem, including directory related information as an essentially atomic operation minimizes the total latency seen in completing committed write network data write transfer operations. Similarly, by virtue of all write file data operations being focused at the end of the active log, as opposed to being scattered throughout the disk drive storage space, data verification operations need only be focused on evaluating just the end of the log end rather than the entire directory and data structures of a conventional filesystem. Consequently, both network data write operations and the integrity of all data written is improved by writing directly to a permanent log structured filesystem.

Log structured filesystems are, however, not entirely effective in all computing environments. For example, log structured filesystems show little improvement over conventional filesystems where the computing environment is subject to a large percentage of fragmentary data writes and sequential data reads such as may occur frequently in transactional data base applications. The write data optimizations provided by log structured filesystems can also be rather inefficient in a variety of other circumstances as well, such as where random and small data block read accesses are dominant. Indeed, as computer systems continue to grow in power and are required to support more and different application environments concurrently with respect to a common mass storage subsystem, the tension between applications for optimal use of the disk drive bandwidth provided by the mass storage system will only continue to increase.

Therefore, a substantial need now exists for a new filesystem architecture that is optimized, including during ongoing operation, for both read and write accesses concurrent with processes for ensuring data integrity and fast crash recovery, and the many practical issues involved in providing and managing a high performance filesystem.

SUMMARY OF THE INVENTION

Thus, a general purpose of the present invention is to provide for a new log device system architecture that maintains many of the advantages of conventional log structured filesystems while providing a much wider range of support for different and concurrently executed application environments.

This is achieved through the use of a data storage subsystem that provides for the efficient storage and retrieval of data with respect to an operating system executing on a computer system coupled to the data storage system., The data storage system includes a storage device providing for the storage of predetermined file and system data, as provided by the computer system, within a main filesystem layout established in the storage device. The data storage system also includes a log device coupled in the logical data transfer path between storage device and the computer system. The log device provides for the storage of the predetermined file and system data within a log structured layout established in the log device. A control program, included as part of the data storage system, is executed in connection with the log device and provides system management over the log device to store the predetermined file and system data in one of a plurality of data segments, delimited by a first free data segment and an oldest filled data segment, to selectively clean the oldest filled data segment to the first free data segment, and to selectively transfer the predetermined file and system data from the log device to the storage device. The control program utilizes location data provided in the predetermined file and system data to identify a destination storage location for the predetermined file and system data within the main filesystem.

An advantage of the present invention is that the operation and management of the log device is independent of the operation and management and indeed the layout of the main filesystem of the mass storage subsystem. The independent operation and management of the log device allows the operation and management of the main filesystem to be optimized independently of the log device to best serve optimization typically for read accesses, such as by file and directory clustering and various forms of data striping to improve the integrity and logical survivability of the mass storage device.

Another advantage of the present invention is that the log device realizes the many practical advantages of log structured filesystems while avoiding the log maintenance related data wrap around and compaction problems associated with conventional log structured filesystems. In the present invention, relocation of segment data on the log device is asynchronous with log device writes. Compaction of data in segments is performed synchronous with the write point cleaning management operation. Since the log device of the present invention is not subject to independent compaction processes, links between sequential segments are not required and the log structured filesystem layout of the present invention is inherently more error resistant than conventional log structured filesystems.

A further advantage of the present invention is that it may be implemented as a pseudo-device driver that may be transparently inserted within conventional operating system layered structures at any of a number of logical connection points. The different operating system insertion points can be chosen between based on application program dependant access strategies including the handling of page lists and I/O buffers as passed between the pseudo-device driver of the present invention and the operating system. As a result, partial data segments may be selectively used as needed in quickly writing data to the log device. Such partial data segments will be automatically compacted as the segments are cleaned by the asynchronous background cleaning process of the present invention.

Yet another advantage of the present invention is that a system of entry point overlay, or stealing, allows the log device to be logically switched in and out of the data stream between the operating system and the mass storage drives based on a variety of parameters including the current write controlling application environment. A system of translation checking insures that the most current read and write file data within the scope of the log device is identified in response to file data reads.

Still another advantage of the present invention is that the operation and management of the log device allows for transparent compression and other data transforms, such as encryption and data hardening, to be selectively applied to the log data as stored in the log structured filesystem of the log device. In particular, high-speed compression of data to be stored on the log device permits a larger effective main filesystem space to be logged, thereby improving the effective read performance available from the main filesystem while maintaining the improved write performance provided by the log device.

Yet still another advantage of the present invention is that main filesystem directory information is encoded into system data that is stored with file data within the data segments stored by the log device. This encoded information permits high performance data location mapping algorithms to provide for translation and inverse translation of log device stored block numbers while minimizing the use of the main memory of a computer system for storing the translation maps. A strategy of progressive writing of partial translation maps and related data to the log device in conjunction with or as part of data segments ensures that the log device is robust and easily recoverable in the event of system crashes and the like.

A still further advantage of the present invention is that the log device itself may be physically structured as a mirrored or RAID based disk drive subsystem operating from the same or a different disk drive controller as the main filesystem storage devices. The reliability of the log device and recoverability of the data stored by the log device can be readily scaled to match appropriately the speed and integrity capabilities of the main filesystem storage device.

A yet still further advantage of the present invention is that the independent operation of the log device permits independent management operations to be performed on the main filesystem storage device in a dynamic manner. Through the operation of the log device, the fundamental filesystem structure of the main filesystem storage device can be changed between a mirrored and arrayed structure and between different levels of RAID structure through progressive management of alterations in the translations maps relating logical and physical storage of file and system data by the main filesystem storage device.

Still another advantage of the present invention is that the log device may be implemented and operated without main filesystem disks actually being used. Where data writes may greatly predominate and particularly where the written data has a relatively short valued life span, write data can be efficiently directed to the log device for essential transient storage and then expired when no longer needed.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein:

FIGS. 5a–h provides progressively exploded views of the logical layout structure utilized in a preferred embodiment of the present invention for the storage of data segments within the log structured layout implemented within the log device;

DETAILED DESCRIPTION OF THE INVENTION

Figure 1:
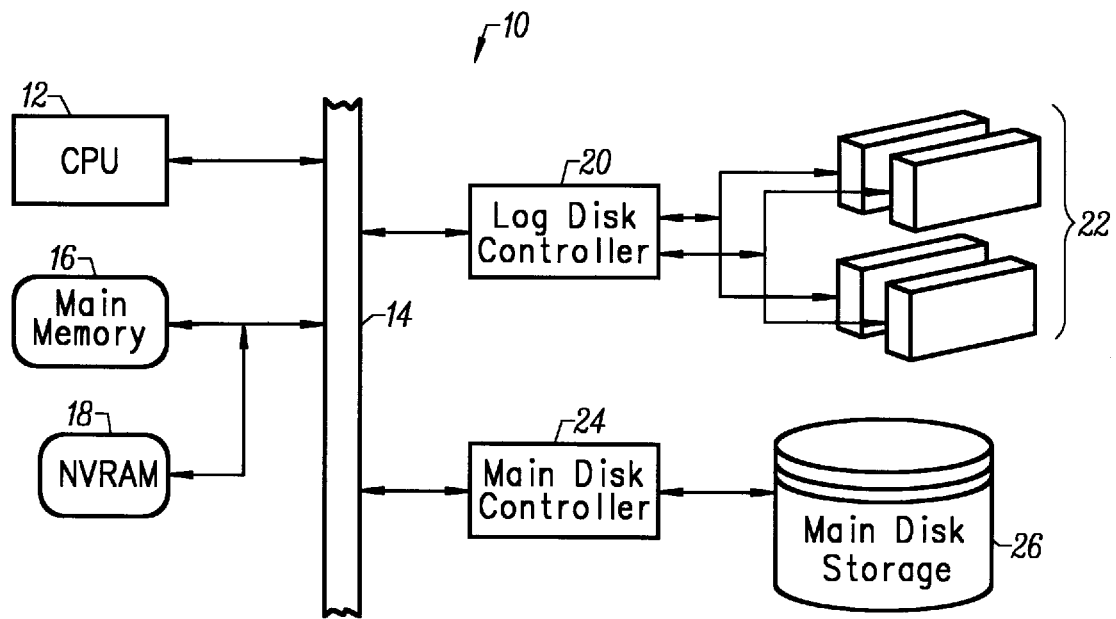
FIG. 1 is a basic block diagram of a computer system implementing a log device in accordance with the present invention.

A computer system 10 including a preferred embodiment of the present invention is shown in FIG. 1. A host processor or central processing unit (CPU) 12 connects through a system bus 14 to a main memory 16 that is used to store application programs and data as well as an operating system used to supervise execution of the applications. The operating system conventionally includes a filesystem module, such as the conventional Unix File System (UFS), and device drivers suitable for establishing the operative interface between the operating system and various peripherals accessible by the CPU 12 through the system bus 14. Optionally, a non-volatile RAM block (NVRAM) 18 can be provided as an adjunct to the main memory 16 for storing certain relatively critical data that may be advantageously utilized during the operation of the computer system 10 and potentially during recovery from a system crash condition.

In accordance with the preferred embodiment of the present invention, a log disk controller 20 interconnects the system bus 14 with a mirrored array of two, as shown, or more disk drives 22 that provide the operative storage for log disk data; logically referred to as the available log device data chunks. A main disk controller 24 provides a conventional interface between the system bus 14 and main disk storage 26. In a preferred embodiment of the present invention, the log disk controller 20 and main disk controller 24 may be physically the same disk controller supporting two logically independent sets of disk drives 22, 26. Again, the first set of disk drives comprise the log device disk drives 22, while the second set of drives is preferably organized as a disk drive array, or farm, that cooperatively and conventionally implements main disk storage 26.

In the preferred embodiment of the present invention, the CPU 12 may be any of a variety of different processor chips and chip sets ranging from, for example, an Intel® 80586, a Motorola PowerPC®, and a Sun MicroSystems UltraSparc® processor. The operating system executed by the CPU 12 may be one of the many Unix® or unix-like operating system that are freely or commercially available, Microsoft Window-NT Server, or another generally similar operating system. The preferred operating system used in connection with the present invention is the Unix-based Solaris® 2.0 operating system available from Sun MicroSystems, Inc.

Unix and other operating systems that provide an abstracted device independent interface to a mass storage subsystem can readily be adopted to utilize the present invention. Even where a device independent mass storage subsystem interface is not normally provided as part of an operating system, such as an embedded real-time operating system, the operating system can be modified, consistent with the principles of the present invention, to utilize a log device for improving the overall performance of any attached secondary mass storage subsystem. Finally, suitable operating systems usable in connection with the present invention will preferably provide support for multi-tasking operations sufficient to allow one or more asynchronous user and/or kernel level processes to provide for background operating management of the log device 20, 22. The structure and operation of a generalized Unix operating system is detailed in "The Design of the Unix Operating System," by M. J. Bach, published by Prentice-Hall, Inc., 1986, which is expressly incorporated herein by reference.

Figure 2:
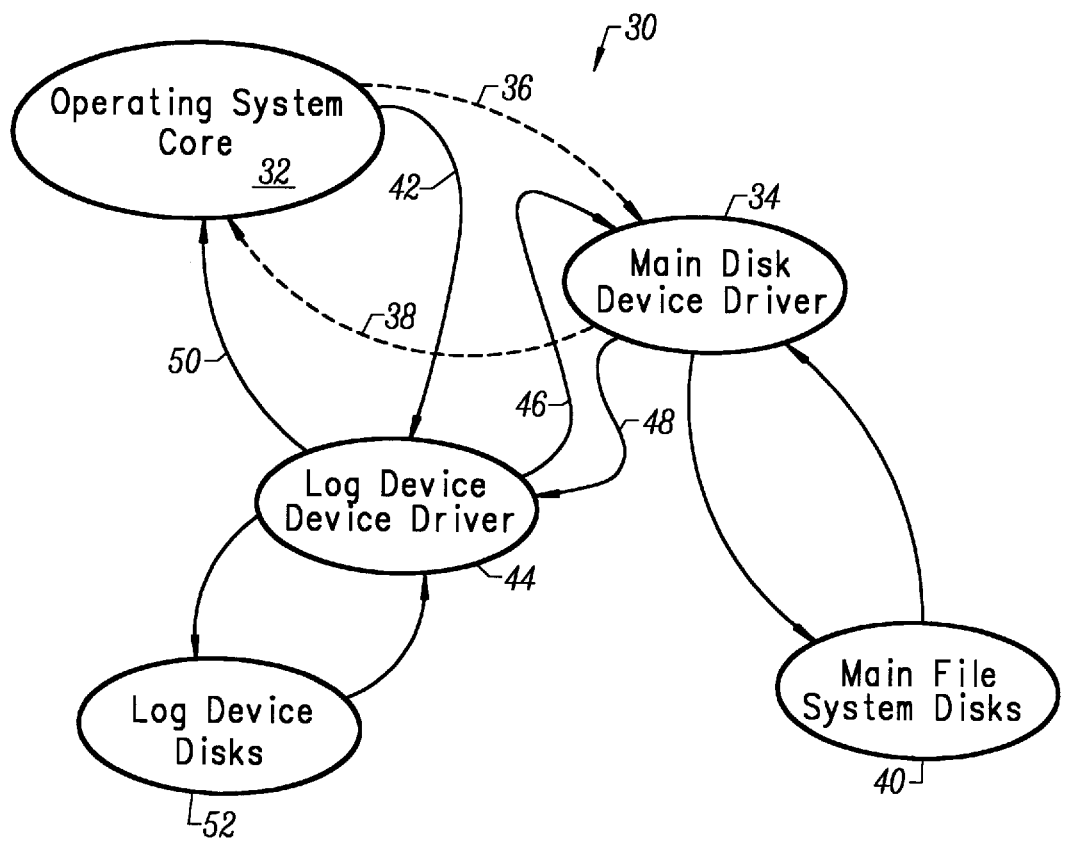
FIG. 2 is a data flow diagram illustrating the effective insertion of the log device pseudo-device driver into the lower levels of the operating system to intercept and selectively route file and system data with respect to the log device disk and through the main disk device driver with respect to the main filesystem storage device.

A data flow diagram 30, showing modified and generally preferred data transport paths in a preferred embodiment of the present invention, is presented in FIG. 2. An operating system core 32 including a file system module, collectively referred to as a Unix kernel, exchanges device independent data streams with a main disk device driver 34 via data paths 36, 38. The main disk device driver 34 provides the necessary and conventional support for transferring the device independent data streams to the main filesystem disks 40 in a manner consistent with the device dependencies necessary to secure data storage and retrieval with respect to the main filesystem disks 40.

In accordance with the preferred embodiment of the present invention, a log device pseudo-device driver 44 is provided in connection with the operating system core 32 and main disk device driver 34. Preferably, the data stream exit and entry points of the operating system 32, otherwise connected to the paths 36, 38, are instead routed via paths 42, 50 to the log device pseudo-device driver 44. The data stream entry and exit points of the main disk device driver are also coupled to the log device pseudo-device driver 44 via new data transfer paths 46, 48. Thus, at least data that is to be written to or read from a selected filesystem nominally maintained on the main filesystem disks 40 is routed through the log device pseudo-device driver 44 and may be made subject to the control operations established by the execution of the log device pseudo-device driver 44. Specifically, the log device pseudo-device driver 44 selectively provides for the routing of filesystem data directed to the main filesystem disks 40 to be at least temporarily stored and potentially read back from the log device disks 52.

By the particular construction of a separate specialized file data layout on the log device disks 52 that is independently operated under control of the log device pseudo-device driver 44, the present invention provides for a highly throughput optimized apparent filesystem write data transfer path from the operating system core 32 through the log device pseudo-device driver 44 to the log device disk 52. This optimized write data path through the log device pseudo-device driver 44 is effectively independent of any read data path 38 that may selectively remain for other logical devices supported by the main disk device driver 34. The read data path 48, 50 from the main file system disks 40 through the log device pseudo-device driver 44 is only slightly less independent of any active write data path to the log device pseudo-device driver 44 due to any potential competition in execution of the log device pseudo-device driver 44 itself. The write data path 42 through the log device pseudo-device driver 44 to the log device disk 52 will be co-dependant on the concurrent use of the read data path from the log device disk 52 through the log device pseudo-device driver 44 to the operating system core 32 via the path 50. The significance of this co-dependance is mitigated by the preferred utilization of a conventional buffer cache for servicing repeated reads within the operating system core 32 itself and substantially avoiding the re-reading of data very recently written to the log device disks 52. Thus, by the preferred operation of the present invention, relatively infrequently read data stored by a logged filesystem, i.e., a filesystem provided on the main filesystem disks that is subject to the logging operation of the log device pseudo-device driver 44, is predominately serviced from the main filesystem disks 40.

In general, all write data directed to a logged filesystem on the main filesystem disks 40 is written to the log device disks 52. A number of selective exceptions and conditions may be recognized by the log device pseudo-device driver 44 where logged filesystem write data may be nonetheless written directly to the main filesystem disks 40. The desired type or types of data that are stored by the log device is preferably a dynamically alterable characteristic tuned in light of the particular nature and use of the logged filesystem. Where read and write data is generally small and random, all write data, including meta-data, may be written to the log device disks 52. If user data writes are typically large or determined to exceed a programmable size threshold, the log device pseudo-device driver 44 may direct such writes directly to the logged filesystem. Small meta-data write and, perhaps small user data writes might then be staged to the log device disks pending a large write migration of such data to the logged filesystem itself. In some situations, the predominant component of the write data for a logged filesystem may be a transaction log or the like. As an essentially write only data object, the write data of a transaction log might alone be directed to the log device disks 52 and later migrated to archival storage or simply discarded as appropriate for the use of the transaction log. Indeed, anytime where data reads greatly predominate data writes, and the volume of new data writes, as opposed to data overwrites, relative to the size of the log device disks 52 is small, the log device disks 52 can be used stand-alone. That is, while the operating system core 32 fully implements a filesystem for managing the storage of data on the main filesystem disks 40, the complete data storage function is performed by the log device disks 52 alone. Physical main filesystem disks 40 may not actually be implemented. The existence and operation of the log device pseudo-device driver 44 is transparent to the filesystem paradigm implemented by the operating system core 32. Consequently, the present invention allows a wide spectrum of log device usage strategies to be constructed and implemented in or through the log device pseudo-device driver 44 based on simple, easily distinguished characteristics of particular data being written to a logged filesystem.

A cleaner daemon is periodically executed under the control of the operating system core 32 to progressively clean main filesystem data as stored on the log device disk 52 and, subject to a number of constraint conditions, provide for the migration of such filesystem data from the log device disk 52 through the main disk device driver 34 for final storage on the main filesystem disks 40. Thus, reads of recently written data that can no longer be satisfied through the use of the buffer cache and that has not been cleaned to the main filesystem disks 40 are satisfied from the log device disks 52.

Organization of the data stored by the log device disk 52 in a physical layout independent of the filesystem format of the main filesystem disks provides a number of advantages over other data organizations including disk caches and stream buffers. The establishment of an ordered data layout on the log device disks 52 enables stored data to be readily recovered in the event of a system crash. All completed atomic transfers of data to the log device disks 52 are fully recoverable from the log device disks 52 without necessary reference to any control data as may, for example, be stored transiently in main memory 16 or at significant cost, in the NVRAM memory 18, at the time of the crash. Each atomic write transaction of user data to the log device disks 52 includes, by operation of the log device pseudo-device driver 44, encoded system data, also referred to as meta-data and distinguished from user data, that can be subsequently decoded to determine the intended destination of the data within a specific logged filesystem on the main filesystem disk 40. As a consequence, the resident store of completed atomic transactions held by the filesystem on the log device disks 52 need only be progressively examined during a system recovery operation to determine where valid data found on the log device disks 52 is to be stored in a corresponding logged filesystem on the main filesystem disks 40. The progressive examination need only proceed from the last known good data checkpoint in the operation of the log device disks 52. The encoded location data enables the performance of data migration from the log device disk 52 to the main filesystem disk 40 both in reconstruction of the main filesystem of the computer system 10 and simplifies execution of the background cleaning process.

In addition, encoding and storing system location data with the user data as stored in data segments in the filesystem of the log device disks 52 permits the data segments to be manipulated and relocated within the filesystem on the log device disks 52. Both data relocation and block compaction can be performed by the cleaner process on an ongoing basis independent of the writing of new data segments to the filesystem on the log device disks 52 and the subsequent migration of data to the logged filesystem on the main filesystem disks 40. Thus, the segment storage space represented by the log device disk 52 is continually cleaned and optimized to receive immediate writes of data segments from the operating system 32 and to selectively defer migration of data to the main filesystem disks 40 in optimization of filesystem data reads by the operating system core 32.

Figure 3:
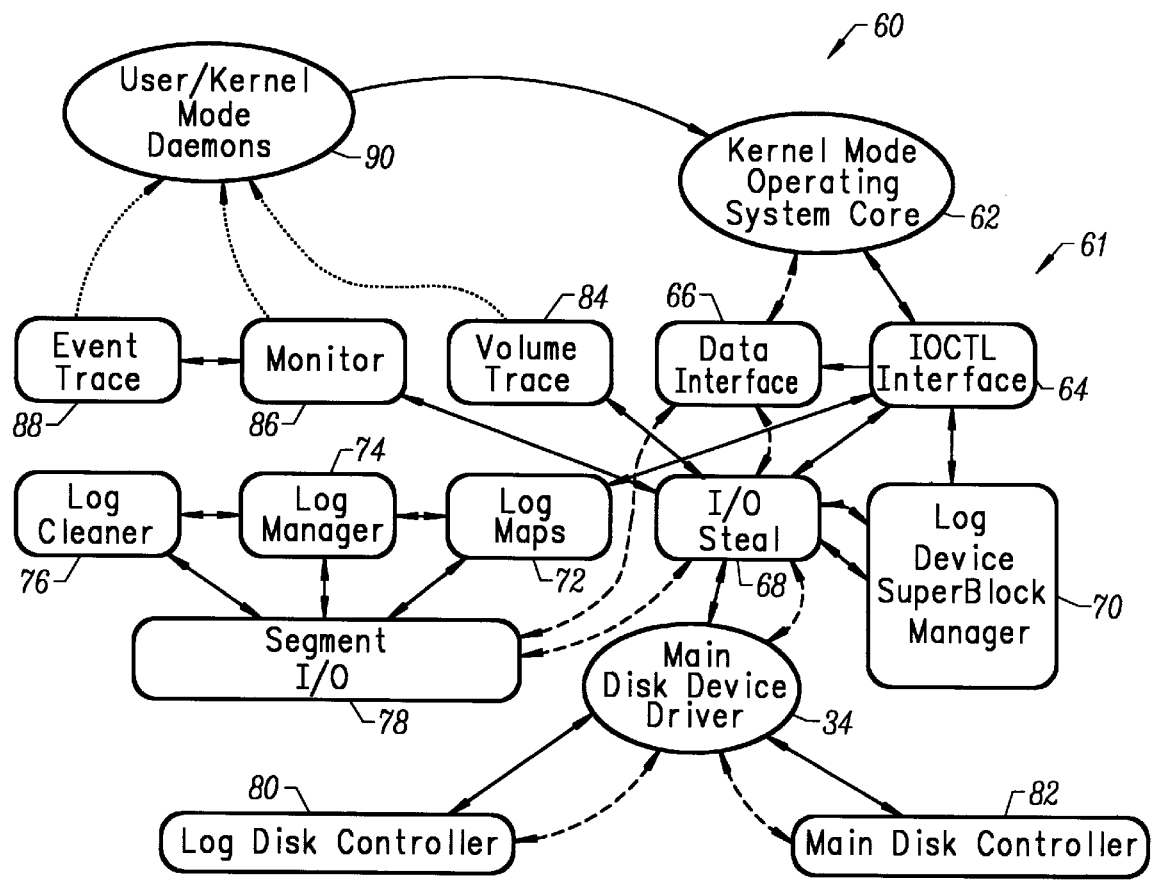
FIG. 3 provides a control and data flow diagram illustrating the control relationships between different component parts of the log device pseudo-device driver in relationship to the core operating system, the main storage disk device driver and the physical disk controllers for the log device and main storage device.

A detailed control and data flow diagram 60 is provided in FIG. 3 illustrating the primary control and data relations between a preferred log-disk pseudo-device driver 61, as made up by modules 64–78, 84–88, the kernel mode operating system core 62, the main disk device driver 34 and various user and/or kernel mode daemon 90 executed as background processes by the operating system core 32. The kernel mode operating system core 62 represents at least the core portion of an operating system that presents an effectively device independent device driver interface that conventionally allows device dependencies, such as the low-level specifics of a physical filesystem layout, to be handled within an attached device driver.

As reflected in FIG. 2, a main disk device driver 54 is conventionally provided to support the main filesystem device dependencies. These device dependencies are relatively conventional and typically provide for the establishment of I/O control, raw, and buffered data stream interfaces to the device driver interface of the operating system core 62. Typically, and preferably, the operating system core 62 includes a conventional device independent Unix filesystem (UFS) or equivalent component that establishes the logical layout of a filesystem maintained on the main filesystem disks 40. The interface presented by the operating system 62 to any relevant attached device drivers includes open, close, read, write and I/O control (IOCTL) interface points, as appropriate for both raw character data streams and, in particular, buffered block data streams. These interface points route through character and block device switch tables that serve to direct the potentially many different data streams supported by the operating system to one or more resident device drivers. Specifically, the data streams are associated with logical major and minor device numbers that are correlated through the switch tables to specify a corresponding device driver entry point to call for the transfer a particular stream of character or block data with respect to the operating system core 62. The switch tables thus effectively operate to selectively map the device driver interface of the operating system core 62 to a specific corresponding interface of a device driver. The device switch tables are initially constructed in connection with the initialization of each of the device drivers associated with the operating system core 62. The device driver initialization routines are effectively discovered and executed by the operating system core 62 during global core operating system initialization.

The device driver initialization routine provided effectively within the IOCTL interface 64 of the log device pseudo-device driver 61 is called subsequently to the execution of the main disk device driver 34 initialization routine. With the device switch tables already initialized with entry points for the main disk device driver, the initialization routine of the pseudo-device driver selectively calls an I/O steal routine 68 that operates to remap selected device driver pointer entries within the device switch tables. A configuration data file stored within the main filesystem is read at the request of the I/O steal routine 68. The configuration file, preferably designated as /etc/dx.conf, supplies an identification and any applicable qualifications on the intercession of the log disk pseudo-device driver with respect to a specific potentially logged filesystem provided on the main filesystem disks 40.

The I/O steal routine 68, when invoked during initialization or subsequently to initiate the logging of a specific filesystem, copies down the entry points for the main disk device driver for each logged filesystem. Filesystems that are to be logged by default are identified in the /etc/dx.conf file. Corresponding entry point addresses are written into the switch tables to refer to the pseudo-device driver 61 in place of the main disk device driver 34. Consequently, the log device pseudo-device driver 61 is in fact called and used for the exchange of data with the operating system whenever an operating system core level reference is made to a logged filesystem as initially identified in the /etc/dx.conf file or subsequently identified to the log device pseudo-device driver 61 through the use of a utility command.

The data path through the pseudo-device driver passes through a data interface 66 Depending on any filesystem specific options specified in the /etc/dx.conf file for a particular logged filesystem, the data stream may be effectively bypassed through the pseudo-device driver 61 by transfer directly through the data interface 66 and I/O steal routine 68 to the main disk device driver 34. The bypassed data is processed in a conventional manner by the main disk device driver and passed to a main disk controller 82 which is logically, if not physically distinct from the log disk controller 80. In this manner, the conventional behavior of the operating system and main disk device driver 34 is maintained for data transfer operations where intercession of the log device is not desired or has been suspended.

Where utilization of the log device is desired, the data path extends between the operating system 62 through the data interface 66, a segment I/O routine 78, the I/O steal routine 68, and a main disk device driver. Where a physically separate log disk controller 80 is used, a separate or other equivalent instance of the main disk device driver 34 is used by the log device pseudo-device driver 61. Conversely, where the main and log disk controllers are physically the same controller, a single instance of the main disk device driver may be used. In either event, data modified by the log device pseudo-device driver in connection with the execution of segment I/O routines 78, is directed ultimately to or from the log device disks 52.

The internal pseudo-device driver data path is managed by a number of control routines implemented within the log device pseudo-device drive 61. The IOCTL interface 64 operates at least as the block data and driver configuration control interface to the operating system 64. While block read and write entry points are separately provided by the data interface 66, the IOCTL interface 64 provides the open, close, IOCTL, and strategy entry points used by the operating system core 62.

Log device specific IOCTL commands are utilized to select and control the extended functionality by the log device pseudo-device driver 61. One such IOCTL command implements a directive that is passed to the data interface 66 to enable or disable any of a number of data transformation operations including, in particular, symmetric data compression and decompression on behalf of an argument specified logged filesystem. Other data transforms such as encryption and data hardening may also be implemented through the operation of the data interface 66. Other directives supported by the IOCTL interface 64 are used to signal the I/O steal routine 68 to temporarily suspend and resume log device support for a particular filesystem and to add anew or completely withdraw intercession on behalf of an identified main disk filesystem. Another directive may be provided to the log device super block manager 70 to signal that super block related information should be flushed to or restored from the super blocks physically residing on the log disk. Other directives can be issued to configure log maps used internally by the log device pseudo-device driver for the desired size and number of map entries that are needed in operative support of a specific instance of the log device. Other directives may signal, preferably issued periodically during the ongoing operation of the log device, that entire copies of the log maps be flushed to the log device disks 52 to comprehensively update or check-point the system data held by the log device. Such periodic flushing of all relevant meta-data to the log device disks 52 ensures that a quite recent set of the log maps are always present on the log device disks 52.

In a preferred embodiment of the present invention, the log device pseudo-device driver distinguishes between native IOCTL commands, issued by the operating system core 62 for execution by the main filesystem device driver 34, and local IOCTL commands that are to be executed by the log device pseudo device driver 61. The native disk driver IOCTL commands intercepted through the remapped, or stolen, device switch table entry points are handled in three distinct ways, depending on their intended function. Native IOCTL commands that retrieve or set device specific information, such as device state or geometry, are passed through to the main filesystem device driver 34 for conventional execution. IOCTL commands that conflict with the logging of a main filesystem are rejected, typically with ENXIO return codes. Lastly, IOCTL commands that perform special read or write functions, such as to detect and resolve the existence of inconsistent log device disk mirrors, are processed through a log device data block location translation algorithm and executed by the main filesystem device driver 61 against the disks of the log device.

Local IOCTL commands generally correspond to and invoke routines within the log device pseudo-device driver 61. Consequently, the user and/or kernel mode daemons 90 can equally utilize the operating system core 62 to pass through the IOCTL commands.

An Open Log Device (LOG_OPEN) IOCTL commands opens the log device for the filesystem whose name is passed in as an argument to the command. If no argument is provided, the log device pseudo-device driver 61 attempts to open the log device for the filesystems specified in a /etc/dx.conf configuration file. Upon success, the log device pseudo-device driver 61 returns the device number of the specified log device. The command fails if the identified log device is busy, the log is dirty, or if not enough memory can be allocated for the translation and segment tables required in operation by the log device pseudo-device driver. The routine invoked by the Open Log Device IOCTL command is also executed in response to Device Attach and Open device driver calls.

The Open Log Device IOCTL command directs the log device pseudo-device driver 61 to read in the appropriate log device superblock. If the superblock is marked as dirty, the log device pseudo-device driver 61 returns an EIO error result. Otherwise, the log device pseudo-device driver 61 allocates kernel memory for data segment buffers, translation and segment maps, and device tables. The log device pseudo-device driver 61 then proceeds to read the corresponding maps from the log device into the allocated kernel memory. The device table is verified against the current system configuration and modified if necessary. The log device pseudo-device driver 61 then updates the time of the last open in the current superblock, sets the log dirty flag, and posts the superblock. If an automatic attachment mode is specified for the logged filesystem by a command argument or parameter of the /etc/dx.conf file, the log device pseudo-device driver 61 immediately attaches the identified logged filesystem by stealing the corresponding entry points of the main file system device driver 34.

Get and Log Device Parameters (LOG_GET_PARMS; LOG_SET_PARMS) IOCTL commands retrieve or set, respectively, log device pseudo-device driver 61 parameters into, or from, a configuration parameter data structure within the kernel memory space of the log device pseudo-device driver 61. The only log device pseudo-device driver 61 parameters that cannot be altered in this fashion are the log disk geometry, and the nature and location of the sector markers.

An Extend Log (LOG_EXTEND) IOCTL command is used to inform the log device pseudo-device driver 61 that the log device has been extended, such as by the addition of a new log device disk. The log device pseudo-device driver 61 assumes that the new portion of the physical log space consists of free data segments, updates the segment map accordingly, and posts the segment maps and the superblock.

An Attach Logged Device (LOG_DEV_ATTACH) IOCTL command instructs the log device pseudo-device driver 61 to immediately attach a particular logged filesystem to the log device pseudo-device driver 61 by stealing the corresponding main file system device driver entry points.

A Suspend Device Logging (LOG_DEV_SUSPEND) IOCTL command instructs the log device pseudo-device driver 61 to suspend the logging of write requests by a specified log device or by all logged devices. However, a suspended log device for a particular logged filesystem does not become completely inactive, since all read and write requests must still be filtered through the translation maps to ensure that current data blocks are returned, in the case of read requests, and matching translations are invalidated, in the case of write requests.

A Resume Device Logging (LOG_DEV_RESUME) IOCTL command instructs the log device pseudo-device driver 61 to resume the logging of write requests for an argument specified logged filesystem or for all logged filesystems.

A Sync Logged Device (LOG_DEV_SYNC) IOCTL command instructs the log device pseudo-device driver 61 to set the state of a logged device to synchronized (sync'd). This command does not actually perform any data movement to sync logged data back to the main filesystem disks. Rather a separate user mode utility program is used to suspend logging by a log disk relative to a specified main filesystem and to flush corresponding currently logged data to that main filesystem. The Sync Logged Device IOCTL command is then issued by the user mode utility to obtain confirmation of the completion of the sync operation or to receive an EBUSY return code if any logged data remains in the log device for the specified logged filesystem.

A Detach Logged Device (LOG_DEV_DETACH) IOCTL command instructs the log device pseudo-device driver 61 to detach a specified logged filesystem, or all logged filesystems. The log device must be successfully sync'd for the log device pseudo-device driver 61 to execute this command.

A Read Superblock (LOG_READ_SUPERB) IOCTL command returns the currently active superblock. A buffer of appropriate size must be provided to receive the superblock copy.

A Flush Superblock (LOG_FLUSH_SUPERB) IOCTL command instructs the log device pseudo-device driver 61 to flush the currently active superblock to the log device disks.

A Read Segment Table (LOG_READ_SEGTB) IOCTL command copies a portion of the segment table into the address space of a user or kernel mode daemon 90. The daemon 90 must provide a buffer of appropriate size. This IOCTL is primarily used in connection with the periodic cleaning of data segments.

A Flush Segment Table (LOG FLUSH_SEGTB) IOCTL command instructs the log device pseudo-device driver 61 to flush the segment table to the log device disks.

A Read Translation Maps (LOG_READ_MAPS) IOCTL command copies a portion of the translation maps into the address space of a user or kernel mode daemon 90. The daemon 90 must provide a buffer of appropriate size.

A Flush Translation Maps (LOG_FLUSH_MAPS) IOCTL command instructs the log device pseudo-device driver 61 to immediately flush all the translation maps to the log device and post the superblock. Since writes are blocked while the translation maps are being flushed, this command effectively suspends all activity by the log device until the flush is successfully completed.

A Wait on Log Event (LOG_EV_WAIT) IOCTL command suspends a calling process until one or more specified log events occur. Waiting on log device events is implemented by internal log device pseudo-device driver 61 condition variables. The following events can be waited on:

log device free space below or above the low or high free space water mark;

log wraparound;

device attach/suspend/resume/detach;

log chunk crossing.

A Read Real (LOG_READ_REAL) IOCTL command address bypasses location address translation to read data from a specified log block address on a log device. This command is used by a user or kernel mode daemon 90 to read segment summary blocks in connection with the log cleaning process.

A Write Real (LOG_WRITE_REAL) IOCTL command bypasses location address translation to write data to a specified log block address on a log device. This command provides three argument selectable functions:

1) as a Write Conditional IOCTL, the command allows the log device pseudo-device driver 61 to decide whether to log the data, or write it to the specified address. This command is typically used in connection with the log cleaning process. The determination of where to write the log block provided with the command is made by the log device pseudo-device driver 61 depending on the then current I/O load and log device disk queue lengths. When the log block is to be written to the specified address, existing translations for any portion of the log block, if any, must be invalidated. Rewriting the data to the log as part of a new data segment is less expensive, since no additional I/O is needed to invalidate translations in this case. A data segment can be reclaimed when all the valid data blocks in the data segment have been conditionally rewritten to other existing data segments;

2) as a Write Forced IOCTL, the command forces the log device pseudo-device driver 61 to write the log block provided with the command at the specified log block address location. This command is used in connection with the sync'ing of the log device. Any existing translations for any overwritten portion of the log block, if any, must be invalidated; and 3) as a Write Without Invalidation IOCTL, the command forces the log device pseudo-device driver 61 to write data at the specified log block location without invalidating any existing translations. This command is used to prepare a log device for use as a self-contained log device, specifically in connection with writing log device meta-data.

A Read Log Segment (LOG_READ_SEG) IOCTL command reads an entire data segment into the address space of a user or kernel mode daemon 90. This command is used in connection with the log cleaning process to obtain log tail data segments. The daemon 90 must provide a buffer of appropriate size.

A Free Log Segment (LOG_FREE_SEG) IOCTL command instructs the log device pseudo-device driver 61 to mark a command argument identified segment as being free. Execution of this command is conditional in that the log device pseudo-device driver 61 will independently verify that no log blocks in the identified data segment are still valid. If the segment map indicates any valid log blocks, the command is rejected with an EBUSY return code. This command is used in connection with the log cleaning process.

A Read Log Statistics (LOG_REAL_STATS) IOCTL command copies the log device pseudo-device driver's statistics counters into the address space of a user or kernel mode daemon 90. The daemon 90 must provide a buffer of appropriate size.

A Turn Tracing On/Off (LOG_TRACE_ON; LOG_TRACE_OFF) IOCTL command serves to turn tracing on and off. When tracing is enabled, all I/O events captured through entry points stolen by the log device pseudo-device driver 61 are recorded and made available to user and kernel mode daemons 90 for analysis and generation of other IOCTL commands that may be used to adaptively and dynamically modify the operating parameters of the log device.

Finally, a Read Trace Data (LOG_READ_TRACE) IOCTL command copies the contents of a trace buffer into the address space of a user or kernel mode daemon 90. The daemon 90 must provide a buffer of appropriate size.

The log manager routine 74 interoperates with the log map routine 72 and the segment I/O routines 78 to implement the physical log structure layout established on the log device. The log map routine 72 manage a number of translation maps ultimately utilized to establish logical correlations between data blocks, as stored in log blocks within data segments, all as stored on the log device, and the data block storage locations within the filesystem layout structure established for the logged filesystem on the main filesystem disks 40. These log maps permit data blocks to be referenced by the log device pseudo-device driver 61 based on logical references specific to the organization of the file system established on the main filesystem disks. By maintaining the appearance of a single location representation for all user data that is passed through the log device pseudo-device driver 61, independent and even multiple filesystem organizations on the main filesystem disks 40 can be supported through the log device transparently with respect to the kernel mode operating system core 62 itself.

The log map routines 72 are called variously by the IOCTL interface 64, log manager routines 74, and log cleaner routines 76 to resolve location translations, update the various log maps and to pass the log maps to the segment I/O routines 78 for storage as a part of one or more user data segments or full meta-data segments written out to the log device disks 52. The log map routines 72 are also called to recover part or all of the log maps stored by the log device disks 52 upon initialization of the log device pseudo-device driver 61 and progressively during ongoing operation so as to support having only a portion of the log maps physically resident within the kernel mode primary memory 16, 18 as allocated to the log map routines 72.

The log manager routine 74 implements volume logging operations that establish and maintain the particular layout of the log structured filesystem on the log device disks 52. The reading and writing of data blocks relative to the log device is initiated by the I/O steal routine 68 by issuing read and write directives to the log manager routines 74. Location translations are obtained as needed by calls to the log map routines 72. The log manager routines 74 then provide for the construction of a data segment containing write data by the segment I/O routines 78, within a segment buffer managed by the segment I/O routines 78, that when deemed complete, are effectively transferred by calls to the I/O steal routines 68 to transfer the data segment to the main disk device driver 34 for writing to the log device disks 52.

Similarly, a read directive received by the log manager routines 74 results in a location translation call to the log map routines 72 and a call to the segment I/O routines 78 to request at least a portion of an identified segment to be read in from the log device disks 52 through the main disk device driver 34 and into a segment buffer maintained by the segment I/O routines 78. The original read requested data block or blocks can then be read from the segment and passed through the data interface 66 to the kernel mode operating system core 62.

The log cleaner routines 76 provide for the periodic servicing of the active segments stored on the log device disks 52. By providing IOCTL commands through the IOCTL interface 64, the log cleaner routines 76 direct the segment I/O routines 78 to read a copy of the data segment at the current tail of the log on the log device into a segment buffer. Each of the data blocks within the data segment held by the segment I/O routine 78 are examined against the log maps to determine whether the data block remains used and valid. The data segment may contain data blocks that are not used and represent nothing more than filler in a partial data segment. Data blocks may also be invalidated for any number of different reasons, resulting in a corresponding log map entry to have been marked invalid or that now effectively points to a superseding data block within a subsequently written data segment. The log manager routines 74 are called upon by the log cleaner routines 76 to compact the valid and used data blocks within the segment held by the segment I/O routine 78. The balance of the current data segment may be filled with new data blocks written through the data interface 66 or as a result of cleaning the new log tail data segment. Where data blocks are actively being directed through the data interface 66 for storage on the log device, the compacted data blocks obtained from the prior log tail data segment may be mixed in order of receipt by the segment I/O routine 78 into the current segment buffer maintained by the segment I/O routines 78. Once a data segment is full or an IOCTL command is received to flush out the current segment, the log manager routines 74 direct the writing out of the new data segment to the log device disks 52.

Equivalently, a log tail data segment read from the log device disks 52 may be compacted through the operation of the log cleaner and log manager routines 76, 74 and added to any newly written data blocks in the segment buffer maintained by the segment I/O routines 78. In all events, the log manager routines 74 and segment I/O routines 78 receive each data block for appending into the current data segment buffer. As each data block is appended, the log manager routines 74 call the log map routines 72 to make corresponding updates to the log maps. Once the log manager routines 74 determine or are notified that the segment buffer is effectively full of user data, the log manager routine 74 directs the log maps routines 72 to append a segment trailer, including at least the relevant segment map entries, and the segment I/O routines 78 to then write out the data segment to the log device disks 52.

As each data segment is conclusively written to or read from the log device disks 52, a log device superblock manager 70 is called, typically through or by the log manager routine 74, to perform a corresponding update of the superblock maintained on the log device. In a preferred embodiment of the present invention, the log device superblock manager 70 calls through the I/O steal routines 68 to the main disk device driver 34 to read and write superblocks maintained on the log device disks 52 independent of the segment I/O routines 78. By providing the log device superblock manager 70 with an independent data path to the log device disks 52 relative to the segment I/O routines 78, the co-functioning of the log device superblock manager 70 and segment I/O routines 78 is simplified. In addition, maintaining superblock integrity is preferably treated as a high priority responsibility by the log device pseudo-device driver 61. A flush IOCTL command received by the IOCTL interface 64 is preferably communicated directly to the log device superblock manager 70 to initiate a superblock update.

The volume trace routines 84, monitor routines 86, and event trace routines 88 are provided as part of the log device pseudo-device driver 61 to collect information on the state and ongoing operation of the log device pseudo-device driver 61. The volume trace routines 84 collects a variety of trace records that serve to document data block reads and writes, as reported from the I/O steal routines 68, data segment reads and writes, as reported from the segment I/O routines 78, and configuration management directives as received and handled by the IOCTL interface 64.

The monitor routines 86 collect a variety of statistics concerning principally the effective performance of data transfers performed by the I/O steal routine 68. The monitored statistics preferably allow for a direct analysis of the number, size and type of data block transfers and data segment transfers performed through calls to the I/O steal routines 68. The collected information permits performance analysis on both a per request basis and a unit time basis. Particular statistics monitored include the rate of and relative proportion of read and write requests received through the IOCTL interface 64. Also monitored are the relative rates of reads and writes of data segments to the log device disks 52, the frequency that read requests are satisfied from the log device as opposed to the main filesystem disks 40, and the effective rate of compaction of data segments as log tail data segments are cleaned and new data segments are written to the log head.

Finally, the event trace routines 88 collects trace records of operational events that occur within the log device pseudo-device driver. Preferably, maskable events signalled in response to independent calls to the IOCTL interface 64, I/O steal routines 68, log manager 74, volume trace routines 84, the monitor routines 86 and segment I/O routines 78 are recorded on an on-going basis. Conditional variables within the various signaling routines allow event signals to be separately enabled and independently masked. Preferably, each of the different routines reporting to the event trace routines 88 signal events that are useful in operational debugging and exception analysis.

The trace records and operational statistics collected by the volume trace routines 84, monitor routines 86, and event trace routines 88 are preferably accessible by both user and kernel mode daemons 90 executing under the control of the kernel mode operating system core 62. The event traces and information received by the daemons 90 is preferably used as the basis for dynamic analysis and adjustment of certain aspects of the on-going operation of the log device pseudo-device driver 61. Dynamic reconfiguration or tuning of fundamental operational parameters affecting the operation of the log device pseudo-device driver 61 and the structure of data segments as written out to the log device disks 52 is preferably directed by one or more daemons 90 through operating system calls to the kernel mode operating system core 62, resulting in the issuance of IOCTL commands to the IOCTL interface 64. Thus, daemons 90 may operate to implement any of a number of different log device specific operational strategies and further dynamically vary these strategies specifically in view of the analyzed performance of the log device pseudo-device driver 61. Although the fundamental parameters of a main filesystem layout may be conventionally static, dynamic tuning of the log disk performance allows an optimization of both the write data efficiency to the log device and the read data efficiency from the main filesystem disks. Consequently, as application load characteristics concerning the size, type and frequency of data reads and writes changes, the configuration of the log device pseudo-device driver 61 can be continually adjusted to obtain and maintain optimum performance.

Figure 4:
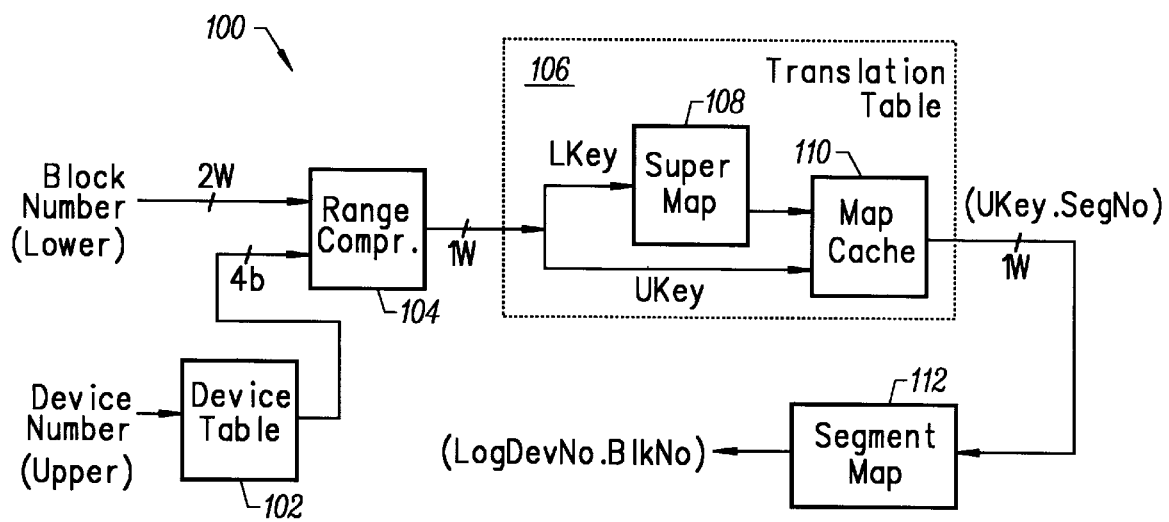
FIG. 4 is a logic flow diagram illustrating the translation of data location identifiers with respect to the main storage device into a location identifier appropriate for use in the storage of segment data by the log device.

The top level translation process flow 100 implemented as an algorithm within the log map routines 72 is shown in FIG. 4. In connection with a data block read or write request directed to the IOCTL interface 64, the kernel mode operating system core 62 provides a logical data block number and a logical device number that serve to uniquely identify the source or destination data block for the request. The block number is preferably the literal sequential block number within the logical storage space of a particular disk drive that the given data block is to be written to or read from. Typically, the block number is a double word or 64-bit wide unsigned integer. The device number is used by the kernel mode operating system core 62 to select a specific disk drive for the data block read or write. This allows the main disk device driver 34 to support, through disk controllers 80, 82, any number of physical disk drives supporting a number of logically distinct filesystems.

The device number is used as an upper input element to the translation routine 100, and the block number is used as a lower input element. The two input elements are utilized together to generate a data segment address The data block specified by the device number and block number is or will be stored in a log block within a data segment at the data segment address.

The device number is initially translated through the use of a device table 102 that serves to map kernel mode operating system core provided device numbers to a consecutive set of small integers that the log device pseudo-device driver 61 utilizes internally to separately identify logged filesystem established within the main filesystem disks. At present, the internal device numbers are limited to four bits each. Thus, up to 15 separate filesystems may be logged through a singular instance of the log device pseudo-device driver 61. A copy of the contents of the device table 102, including device name, device number and internal device number are preferably saved as part of the superblock on the log device disks 108. A typically initialization time execution of the log device superblock manager 70 performs the initial superblock read and validation. The initialization routine then restores from the superblock the contents of the device table 102 for subsequent use by the log map routines 72. In addition, an IOCTL command to initiate the logging of a new filesystem on the main filesystem disks 40, or to detach a previously logged filesystem results in a corresponding update of the device table 102 by the log map routines 72. The new contents of the device table 102 written out to the log device with the next update of the log device superblock by the log device superblock manager 70.

The internal device number and the block number are then provided as inputs to a range compression algorithm 104 that places the significant information provided by the internal device number and block number into a single word wide 32-bit value. In accordance with the present invention, the block number can be scaled down, or right shifted, where the basic data block size used by the log device is larger than that of the logged file system on the main file system disks. Typical block sizes for the main filesystem disks 40 are 512 bytes and 1 kilobyte (kbyte). Log block sizes may range from 512 bytes to 8 kbytes or more.

The unused most significant bit positions of the block number can also be trimmed, resulting in preferably a 24 bit wide value. The precision of this value determines the number of log blocks that can be addressed on a particular log device drive. Thus, for 8 kbyte log blocks, the 24 bit internal block number can uniquely address 128 gigabytes of log disk storage. For 512 byte blocks, the 24 bit internal block number can address eight gigabytes of log disk storage. If a 26 bit internal block number is utilized, between 2 and 32 kbytes of log block address space can be referenced. Thus, even while reserving the two most significant bits of word wide output value for use as flags, the internal block number and internal device number can be concatenated together within a one word 32 bit value.

The internal device/block number produced by the range compression algorithm 104 is provided to a translation table algorithm 106. The lower half-word of the internal device/block number is preferably utilized, due to its relatively or likely more uniform distribution of values, as a hash address index into a super map table 108. The hash index selected value read from the super map table 108 is preferably combined with the upper half-word of the internal device/block number to specify an address offset into a map cache table 110.

In practice, particularly for determining whether the log device stores a particular data block, the lower half-word (LKey) is applied as hash index value for selecting a corresponding entry in the super map table 108. The value stored by the super map 108 corresponds to an effective y indices into the map cache table 110. The upper half-word, with the two most significant bits masked, forms an upper key (UKey) that is utilized as a content addressable value for selecting a particular x indices entry in the map cache table 110. The entry identified in the map cache 110, when read, provides the upper key and a segment number concatenated as a one word wide output value [Ukey,SegNo] from the translation table 106.

The combined upper key and segment number value is then used as a row index into a segment table 112. Each row of the segment table 112 potentially stores an external log device disk number and log block number [LogDevNo, LogBlkNo] sufficient to address any log block stored in any of the data segments on the log device disks 52. If a particular log block is identified as used and valid by status data also stored by the segment row, the segment containing the desired data block can be validly read to obtain the desired data block.

When writing a new data segment to the log disk, the translation algorithm 100 is pro-actively executed creating new entries in the supermap table 108 and map cache 110 as needed to reference an empty entry in the segment table 112. The address of the first available log block within the first free data segment on the log disk and the corresponding log device number are then written into the newly allocated entry in the segment table 112. Eventually, the data segment is itself written to the log device disks 52. Subsequent references by the kernel mode operating system core 62 to a specific device number and block number [Ukey,Lkey] combination for a logged filesystem will then uniquely evaluate to this particular row entry in the segment table 112, at least until the data segment is relocated through cleaning or otherwise invalidated and the segment row updated.

When a request is received to read a data block from a main filesystem whose entry points have been stolen, the log device pseudo-device driver 61 is required to determine whether the requested data block is currently stored on the log device disks 52. Where, the corresponding logged filesystem has at least not been detached, the translation algorithm 100 is utilized to identify the potentially corresponding log device drive and log block from the segment table 112. If the successively identified entries in the super map, and map cache are empty or invalid, the lookup fails and the read request must be satisfied from the main filesystem disks 40. If the lookup succeeds through to the segment table, the selected segment table entry is examined. Each used and valid segment table entry stores a device number and block number entry for each data block stored within the data segment. The data blocks within the data segment and the device/block numbers in the segment table entry are stored with an ordered correspondence. Other similarly ordered status bits stored by the segment table entry specify whether a corresponding data block is used and valid. Thus, a data block specifically referenced by the operating system core 62 can be determined to be stored on the log device and, further, distinguished as being presently valid or invalid before the data segment need be read in by the log device pseudo-device driver. Since data segments are of known size, the log block number can be used, subject to a modulo data segment size calculation, to identify the data segment containing the addressed log block.

Where the identified data block is marked valid, then at least the relevant log block of the data segment can be read in by operation of the segment I/O routine 78 and the referenced data block transferred through the data interface 66 to the operating system core 62. Alternately, where the data block is to be migrated or flushed out to the main filesystem disks 40, the device and block number for the data block is passed to and used by the main disk device driver 34 to specify the transfer destination of the data block on the main filesystem disks 40.

Referring now to FIG. 5, an exploded view is shown of the various data structures utilized on or in support of the log device. FIG. 5a provides a graphical representation of the logical storage space of a log device disk. Conventionally, an initial small portion of the disk data space, designated H/W, is dedicated to storing various hardware parameters that qualify the size and type of storage space presented by the specific implementation of the disk drive.

Following the hardware parameter block, a log header block and a segment data block are provided. As shown in FIG. 5b, the log header preferably contains two copies of the log device disk superblock. The superblock structure holds information defining:

- the respective sizes of the entire log, a log block, a data segment, and a data block, the logical position of this disk in the log (nth of m disks), and a versioned serial number identifier;
- the ASCII device name and device major/minor number of the log device;
- the ASCII device names and device major/minor numbers of the main filesystem devices that are being logged, including information for each defining the relevant state of the filesystem (logged, suspended) and configuration data for the volume, monitor and event routines;
- the log segment number of the most recently written user data segment and segment map segment;
- the log segment numbers of the first and last free data segments;
- the free segment data space low and high water marks; and
- status flags used to identify whether the log is clean or dirty and that a complete superblock image has been written.

Two copies of the superblock are stored in the log header block. The superblocks are alternately written to ensure that at least one copy of the superblock maintained within the log header block is valid at all times. The log device superblock manager 70 is responsible for alternate copies of the superblock to be written to the log header block, to provide each superblock copy with a sequential, or versioned, serial number when a complete instance of the superblock is written out to the log header and to mark each superblock copy as being valid and complete as written to the log header at the conclusion of the writing of each superblock copy.

The segment data block of FIG. 5a, generally representing the remaining available data storage space of the log device disk drive, is pre-configured to store data segments of generally fixed length; the segment size can be selectively changed in certain circumstances to effect adaptive optimization of the operation of the log device. The data segments are utilized variously to store copies of the supermap table 108 (supermap segments), the map cache table 110 (map cache segments) and the segment table 112 (segment map segments) in addition to user data (user data segments).

Within the segment data block, as shown in FIG. 5c, the data segments are arrayed as a continuous sequence of data segments distinguished with respect to the use of the log device disk as including a physically first segment, a physically last segment, and a current first free and last free segments, adjacent the local log head and local log tail data segments, respectively, within the segment data block. Ongoing identification of the first free and last free segments of a local log device disk, and thus of the log as a whole, is maintained by the log manager routines 74. Thus, the log is operated effectively as a circular data segment buffer spanning the segment data blocks of one or more log device disks. New data segments are written to the log head while log tail data segments are progressively cleaned by the log cleaner routines 76. Meta-data segments are cleaned and, if still valid, relocated to the first free segment log head. User data segments are cleaned and relocated, at least in part, to either the first free segment at the log head or migrated to the main filesystem disks 40. The identifications of the first and last free segments wraps around the log as new data segments are written and old data segments are cleaned from the log as a whole.

A more detailed view of a data segment is shown in FIG. 5d. The data segment preferably consists of a segment body used for storing either system data or user data and a trailer block that is used to store system data relevant to the data stored by the segment body of this and potentially other data segment bodies. The structure of both the segment body and trailer blocks will vary depending on whether the content type of the data segment.

User data is stored in a user data segment structure generally as shown in FIG. 5e. The segment body portion of the data segment includes a concatenated series of generally fixed size log blocks, each containing a concatenated series of individual data blocks. The log block size is at least equal to the size of a data block, if not many times the size of a data block, and no greater than the size of a data segment. The chosen ratios of log block size to data block size and segment size to log block size are performance optimization parameters.

In a preferred embodiment of the present invention, the log block size may range from 512 bytes to a generally maximum size of about 60 kilobytes. The block size is selected to optimize for the intrinsic or natural characteristic of the filesystem being logged. Thus, for a filesystem utilized by a data base management system (DBMS), a 2 kilobyte block size may best match the typical filesystem block write by the DBMS. The typical block write size for network file system (NFS) services is 8 bytes. Consequently, an 8 byte block size will likely prove optimal for NFS mounted filesystems.

In a standard operating configuration utilizing 512 byte data blocks and 8 kbyte log blocks, 4 data blocks can be packed into a log block. Where the default size of a data segment is 64 kbytes in length, 30 log blocks are concatenated to form a segment body. The remaining eight kilobyte space is allocated as a data segment trailer block, also referred to as a segment summary for user data segments. Where the data block size is 512 bytes and the block size is 8 kbytes, as for logging NFS mounted filesystems, the default data segment of 64 kbytes stores seven log blocks to form a segment body. The remaining eight kilobytes may again be allocated as the data segment trailer block. However, typical filesystems that support NFS usage either automatically or can be programmatically set to encode distinctive headers or identifiers within their write blocks of data. Where such native identifiers include sufficient information to obviate the need for a separate segment summary, a 64 kbyte data segment can be used to store 8 full log blocks.

The segment summary, when used, includes a segment summary header, a segment map block, a markers block, a relocations block, and a segment summary trailer. The segment summary header and trailer, not shown in FIG. 5e, are identical log disk data structures that are intended to contain identical data. The segment summary header and trailer structures store:

the current segment number;
a segment type identifier (user, segment, map cache or super map);
the segment number of the prior segment of the same type;
a segment serial number that is used to version written data segments;
a segment time stamp that serves as a basis for chronologically ordering written data segments;
the segment number of the last map segment; and
the segment number of the current last free segment in the log.

By requiring data identity between the header and trailer of a segment summary, the data content in the blocks between a header and trailer pair can be uniquely determined to be valid.

The segment map block is used to store a segment map entry for each of the data blocks within the segment body of the same user data segment. Additional segment map entries may be included in the segment map entry block. These additional entries pertain to data blocks of other user data segments previously written to the log device. Data block invalidations and other updates to the segment map entry for a data block can thus be performed without requiring a previously written data segment to be either updated in place or updated and relocated to the log head. Updated segment map entries, rewritten to the log device as part of a new user data segment, effectively preserve the current state of the segment map without interrupting the continuing stream of data segments that are being written to the log device disks.

The markers block stores signature data used to validate that each data block has been written completely to the log device. Ordered marker entries are stored in the markers block preferably in direct correspondence with the ordered data blocks in the user data segment. In preferred embodiments of the present invention, the markers entry for a data block may be internally generated or simply provided by an external application that is the source of the user data. Internally generated signatures are created from a copy of the first several bytes of a data block. The bytes of the markers entry are replaced in the data block itself with a signature byte value that, if subsequently read and verified, ensures that the entire data block was validly written. The internally generated signature byte value may also include additional information that specifies the intended order of the data blocks within a log block. Thus, where a particular disk drive may reorder a multiple data block write, the intended order can be determined by comparison of the signature bytes to the ordered entries in the markers block. With 512 byte data blocks and four byte signatures, the markers block fits within a single data block and is therefore assured of being internally correctly ordered.

Application programs, particularly sophisticated database management systems (DBMS) anticipate the potential for data block re-ordering and may accordingly provide their own signatures. Where a logged filesystem is specified to use externally provided signatures, the presumed data block signatures are simply copied to the markers block. Comparison of the signatures from the data blocks with those of the markers block still serves to ensure that the corresponding data blocks have been validly written.

The relocations block provides storage for qualification data specific to the respective entries in the segment map block. These additional qualifications include identifying whether individual segment map entries are valid and the number of times that individual data blocks within a user data segment body have been cleaned by operation of the log cleaner routines 76. As with the markers block, each entry in the relocation block is preferably four bytes or less, allowing the entire block to fit within a single typical 512 byte data block.

A general representation of a segment map segment is shown in FIG. 5f. The segment trailer block is constructed in a manner substantially the same as the trailer block used in a user data segment. The trailer block of a segment map segment includes a header block (Hdr), a map summary (not shown), a segment signature (not shown) and a pointer block (Ptr) that is a second copy of the header block. The header and pointer blocks again contain:

the current segment number;
a segment type identifier (user, segment, map cache or super map);
the segment number of the prior segment of the same type;
a segment serial number that is used to version written data segments;
a segment time stamp that serves as a basis for chronologically ordering written data segments;
the segment number of the last map segment; and
the segment number of the current last free segment in the log.

Validity markers and relocation counts for each of the segment map entries provided in a segment map segment are stored in the map segment summary while segment signatures for each of the data blocks within the segment body are stored by the segment signature block.

Significantly, the pointer block of each data contains the segment number of the last previously written user data segment and the last previously written segment map segment. By utilizing a segment number reference, rather than a relative pointer reference, both the system and user data segments are not only internally self-describing, but define a self-described and recoverable thread of like-type data segments.

As illustrated in FIG. 5f with respect to FIG. 5e, individual segment map entries are present in the segment map block of a user data segment at least to describe the user data log blocks that make up a majority of a user data segment. As also shown in relation to FIG. 5e, the segment body of segment map segments is dedicated to storing contiguous portions of the global segment map table. By flexibly allowing entire data segments to be dedicated to transferring copies of the segment map to the log device, in effect as part of the user data write data stream, the present invention permits a rapid saving of current global state data to the log device.

The segment body of a segment map segment consists entirely of segment map entries. In practice, the total size of the global segment map is not only larger than the size of a single data segment, but may be several times the size of the portion of the segment map maintained in the table 112 within the memory 16 at any one time. To accommodate fractional portions of the segment map table 112 being stored in individual segment map segments, the header block of a segment map segment also records an nth of m segment map segment identifier. Nominally, small sets of segment map entries are written out to the log device as part of user data segments. However, whenever the current segment map table is flushed to the log device, such as in anticipation of a system shut down or in periodic maintenance of the log device, full segment map segments are written out to the log device until the entire global segment table is validly resident on the log device disks. In effect, periodic flush operations result in the log device being check-pointed at intervals, thereby improving and ensuring the recoverability of the data held by the log device.

Each segment map entry, as individually shown in FIG. 5f, includes a segment map number and a serial number identification. Flag and status information defining the current state of the corresponding data block, and a data block inverse translation completes an individual entry. The inverse translation directly preserves the original disk address of a corresponding data block as stored within a particular data segment. Since both the log device block address of a data segment and the inverse translation for each data block are preserved explicitly on the log device, the data location relationships between data as stored on the log device and within the main filesystem are fully determinable by an ordered evaluation of the most recent set of segment map segments on the log device and any user data segments subsequently and validly written out to the log device.

In a manner similar to the use of segment map segments, cache map segments, as shown in FIG. 5g and supermap segments, as shown in FIG. 5h, are used in flushing the contents of the map cache table 110 and supermap table 108 to the log device. Both map cache and supermap segments employ segment trailers that have essentially the same definition as the segment trailer used in the segment map segment. Each cache map entry stored as part of the segment body of a cache map segment includes a cache line identifier (LI), a cache line size value (size), and some number of individual map translation entries. As previously described, each map translation entry stores a combination of an upper key value (UKey) and a data segment number. Similarly, the segment body of a supermap segment simply contains an image copy of an ordered entry (LKey) from the supermap table 108.

The cache map segments and supermap segments, like the segment map segments, are periodically flushed from memory 16 to the log device periodically during the on-going operation of the log device and, in particular, in immediate anticipation of a system shutdown. Thus, whenever the log device of the present invention is properly shut down, the last few data segments at the log tail will be a sequence of segment map, cache map and supermap segments. However, when restarting the operational use of the log device, recovery of the cache map and supermap segments is not essential. Due to the completeness of the data contained within the segment map segments, both the cache map and supermap segments can be reconstructed independently from the segment map segments. Thus, the segment map segments are preferably flushed to the log device at a higher priority than any other type of segment, including user data segments, particularly where an unanticipated failure or operational termination occurs.

Figure 6A:
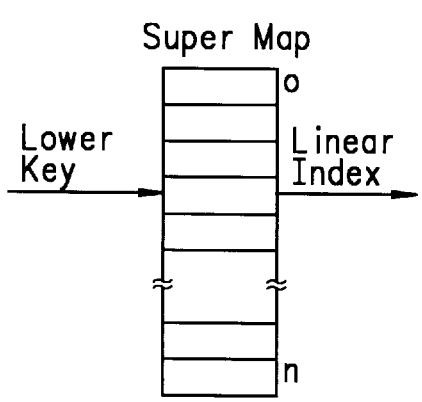
FIGS. 6a–c provide graphical representations and subentity identifications for the super map, map cache, and segment table utilized in the translation algorithms of a preferred embodiment of the present invention.

The supermap table 108 is shown and described in greater detail in relationship to FIG. 6a. The supermap table is used as a first level address hash table used to store linear indexes into the map cache table 110. The number of entries in the supermap is dependant on the number of log block translations required to be supported for the storage size of the log device and correspondingly established log block and segment sizes. A preferred log device, referred to as having a reference configuration, utilizes a one gigabyte segment body log device disk with 8 kbyte log blocks that are partitioned into 64 kbyte data segments. A separate block translation is required for each of the log blocks within the log device. Thus, 131,072 block translations are required to uniquely map all of the data that may be stored within the log device. By establishing a map cache design parameter where up to 15 segment references can be stored in each a map cache line, the complete supermap can be determined to require a maximum of 8,739 entries. Accordingly, three supermap segments are required to store the entire supermap table on the reference log device.

Figure 6B:
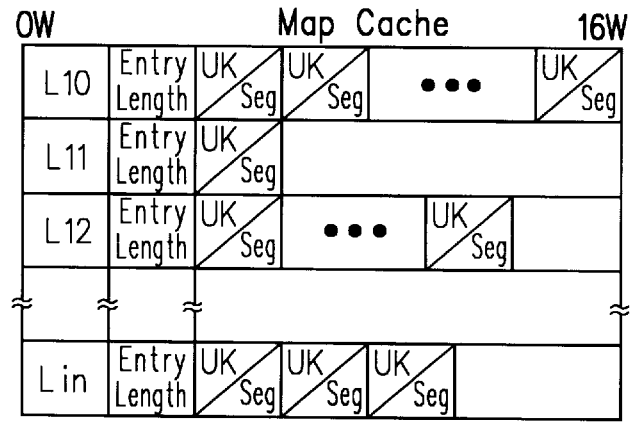

The map cache is representatively shown in FIG. 6b. For the reference log device, each map cache line is 16 words wide. The first half-word of a cache line contains the linear index number of a particular map cache line. The second half-word stores a binary value specifying the number of map cache entry translations that are validly present in the remaining 15 words of the cache line. An entry length of zero specifies that the corresponding map cache line is not presently used and any entries present are not valid. Cache map translations are formed from a half-word upper key (UKey) derived from the combined device number and block number as initially presented to the translation algorithm 100. The next half-word is allocated to specify the segment number corresponding to the translation. Thus, each translation entry occupies a single word and between 1 and 15 translations may be stored in a single cache map line.

Preferably, the cache map table 110 is managed utilizing a pool memory allocation scheme so as to minimize unused memory within the map cache 110 as stored in memory 16. The cache map entry pool is initialized with a mix of unused cache map entries for storing 1, 3, 5, 7 and 15 cache map translations. As translations are added to the cache map, minimum length cache map lines sufficient to hold an initial translation are used. Subsequent translations that index through the supermap to a common or previously populated map cache line results in the translation being stored in an available translation entry location or causing a copy down of the cache map line to an unused cache map line providing twice as many translation entry locations. Both the new and preexisting translations are copied to the new map cache line, the entry length of the cache line undated, and the linear index number is stored at the beginning of the line. The prior line is then cleared. By choice of the size of the supermap and the number of available linear index numbers, the potential number of lower keys can hash to a common linear index can be effectively limited to 15 translations.

The map cache is utilized both in support of data segment reads and writes. Where a data segment is to be written, the lower key hash through the supermap determines a linear index into the map cache. A sequential or, alternately, binary tree search through the map cache determines whether a corresponding linear index identified map cache line is presently in use. If not, a cache line is allocated and used.

Where a corresponding map cache line has already been allocated, a short series of management determinations are made. First, the upper key of the write translation is used a content addressable selector against the upper keys of the translations present in the map cache line. Where an upper key match is found, the new translation is written into the corresponding translation within the map cache line, effectively invalidating the prior translation. Where an upper key match is not found, a new cache map line is allocated if and as needed to accommodate storing the new translation entry in the cache line. In both events, the entry length value is updated to correctly identify the number of valid translation entries existing in the corresponding map cache line. Translations present in the map cache that are initially allocated and empty or are subsequently invalidated through deletion or migration of the underlying segment data.

By design, the map cache lines described above are fully self-identifying. No relative pointers are utilized or values that are hardware configuration specific. As a consequence, map cache lines and, indeed, the entire map cache itself can be flushed to the log device disks without any additional processing and subsequently restored with equal speed.

Figure 6C:
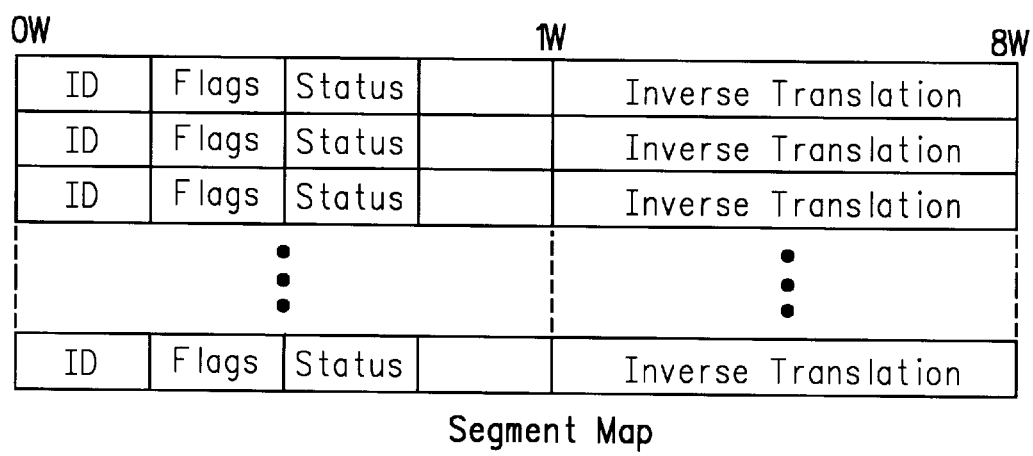

Segment table entries, as stored in the segment map 112 are illustrated in FIG. 6c. Each entry in the segment table is preferably two words in length. Within the first word of the entry, a segment number and serial number is stored in an identification field (ID). A flags field may be used to store three and a status field identifies the validity of the log blocks that make up the corresponding data segment. An inverse translation is provided in the second word of the segment entry. This single word stores an internal representation of the original device number and block number provided to the translation algorithm 100 with a data block. In the reference configuration, 112 translations can be stored in each segment map entry.

Again, as with both the supermap and map cache structures, the segment table entries are entirely self-identifying. Consequently, individual segment map entries can be separately or collectively saved out from and read into the in-memory segment map table 112 without further processing of the entries. Consequently, the storage and retrieval of segment table entries can be performed quite efficiently. This efficiency directly supports having only a subset of the full segment map in memory at any one time. Least recently used in-memory segment entries can be flushed to the log device to make room for newly referenced segment entries to be brought into the segment map table 112.

Figure 7:
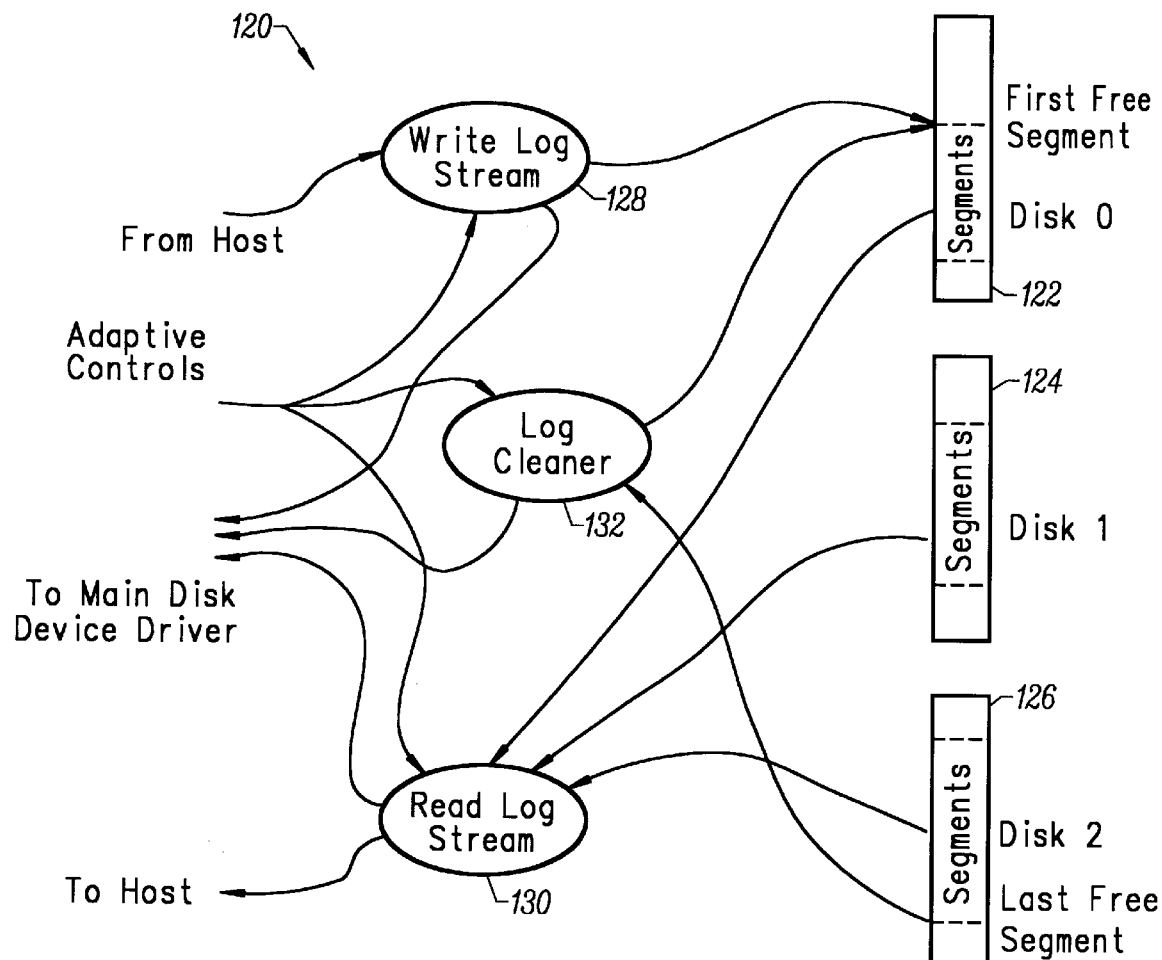
FIG. 7 provides a data flow diagram illustrating the operation and management of the read and write log streams with respect to the log device and the asynchronous background operation of the log cleaner process.

The data and control flow diagram 120 illustrated in FIG. 7 generally describes the ongoing operation of a log device consistent with the present invention. As shown, the illustrated log device is constructed utilizing three physical disk drives 122, 124, 126. The data segments that comprise the storage space of the log device are stored in the segment data blocks of each of the drives 122, 124, 126. Although the segment data blocks of the three disk drives 122, 124, 126 maybe initially unused, eventually actively utilized data segments may, as shown, be present on each of the disk drives established within a single logical and contiguous log. Utilizing more than a single disk drive to store the log allows the first free data segment to be located on one drive 122 while the last free data segment is located on another drive 126. Consequently, read and write operations to the head and tail of the logical log may occur in a largely unconstrained manner independent of one another.

Where multiple disk drives are used, each of the log disks 122, 124, 126 maintain their own hardware (H/W) and log header blocks specific to their respective disk drive. Each of the drives 122, 124, 126 therefore identifies its own first free data segment and own last free data segment. The ordered relationship between the individual log drives 122, 124, 126 and the first and last free data segment identifiers for the log as a whole is preferably maintained internal to the log manager routines 74. This information is preferably initialized from the superblocks held by each of the log disk 122, 124, 126 by reference to fields within the superblock that serve to describe each log disk as the nth of m log disk for an identified filesystem on the main filesystem disks.

When first initialized, both the head and tail of the active log will exist on the same log disk drive. As data segments are received ultimately from the host computer system through the log device pseudo-device driver, separately illustrated as the write log stream 128, each data segment is stored at the then current first free segment within the log device. Since the physical data layout of the log structured device is entirely hidden from the host, data received from the host is formed into corresponding data segments within the write log stream 128.

The configuration of the log device is, preferably, programmable through IOCTL commands provided through the log device pseudo-device driver, including specifically the write log stream 128. Dynamic configuration and reconfiguration through programmable adaptive controls applied to the write log stream 128 on an initialization of the log device pseudo-device driver 61 and, as desired, during the on-going operation of the log device is preferably provided by the user/kernel mode daemons 90. For example, a current default log block size of 8 kbytes may be dynamically reduced to 4 kbyte in order to optimize the operation of the log device to smaller data block writes by the host computer. Other parameters that can be adaptively controlled include the total size of a log segment and the overall size of the log device utilized at one time. Since the write log stream 128, in effect, contains the tables underlying the translation algorithm used to store and retrieve data segments from the log device, changes to the fundamental structure of the physical data layout may be performed dynamically without dependance on existing aspects of either the host computer system or the potentially various filesystem structures present on the main filesystem disks.

The adaptive controls permit fundamental aspects of filesystems provided on the main file system disks to also be dynamically modified. For example, where entire data stripes of a RAID-3 configured filesystem can be held entirely by the log device, the data stripe may be progressively written back to the main filesystem disks in the form of a RAID-5 stripe. This is accomplished by altering the translation algorithm 100 to account for the difference in RAID filesystem layout organization. In effect, many fundamental aspects of a filesystem provided on the main filesystem disks that were previously static can now be dynamically modified through a progressive logging and rewriting of the data to or between filesystems on the main filesystem disks.

In as much as adaptive changes can be applied to the physical layout of the log disks to optimize operation for writing, the present invention thus efficiently permits the filesystem layout on the main filesystem disks to by dynamically altered particularly to optimize operation for data reads.

In the preferred operation of the log disk pseudo-device driver, data segments are populated on a disk 0 122 until approximately 70 percent of the data segments are actively used. The remaining 30 percent of free disk segments are maintained open preferably to receive a flush of system data segments should an immediate need for a flush operation occur.

Once a log disk has reached the filled segment threshold, the head of the logical log wraps to the next log disk in sequence. Thus, the log structured device operates as a logically continuous circular buffer for data segments. The log tail is continually cleaned on a generally periodic basis by the background operation of the log cleaner routines 132. Since the log cleaner routines 132 are responsible for cleaning log blocks from the last used data segment to construct new data segments to be written to the current first free segment of the log, the log cleaner routines 132 are also responsive to log device layout changes directed by the adaptive controls. The log cleaner routines 132 thus provide for the reading of segments from the last used data segment in one physical layout form while writing out a cleaned data segment to the current first free data segment location utilizing a new desired physical layout.

With each invocation, the log cleaner routines 132 examine the log blocks of the last used data segment. Based on the segment map entries and markers in the trailer of the data segment, particularly as compared against the current state of the map cache as held by the map cache table 110, to determine whether log blocks within the last used data segment have been invalidated as a consequence for the underlying data within a log block overwritten or deleted. Individual data blocks within the log blocks may be marked as invalid and entire invalid log blocks may be dropped from the data segment. The segment map, markers and relocations blocks within the segment trailer are correspondingly modified.

As part of the data segment cleaning, the relocations information within the user data segment trailer is examined to determine whether any particular log block has been relocated through cleaning in excess of a threshold number of relocations; the threshold number may be set to an adaptive control defined value. Individual log blocks that have been relocated more than the current relocation value are not incorporated into the new cleaned data segment. Rather, the data blocks within the log block are provided with their corresponding inverse translations to the main disk device driver 34 for writing out to the main filesystem disks 40. In a preferred embodiment of the present invention, the default threshold relocation value is set at three. This value can be modified dynamically to a lower value should the segment data storage space provided by the log device tend to fill at too high a rate. Alternately, the relocation parameter value may be increased to slow the rate of migration of data blocks from the log device to the main filesystem disks. This permits actively or repeatedly written data to be better isolated on the log device for a longer period of time to minimize migration writes to the main filesystem disks and preserve greater bandwidth for main filesystem disk read operations.

Finally, the log device pseudo-device driver 61 routines responsible for managing the read log stream 130 are responsible for initially determining whether a host requested data block is validly present on the log device. Again, this determination is made through the execution of the translation algorithm 100 to determine whether a log block contains the requested data block. Where there is no matching translation entry, the read log stream routines 130 pass the read request onto the main disk device driver.

However, where a valid match is found, the read log stream 130 is responsible for reading in the corresponding data segment. Since read operations may be random, the requested data segment may lie on any of the log disks 122, 124, 126 within the log device, as illustrated. By utilizing multiple log disks, the chances that the read request must be satisfied from the same log disk that includes the first free segment of the log head is reduced. The operation of the buffer cache within the primary memory 16 further serves, in operation, to reduce the occurrence of disk read requests for a given data block close in time to write data requests for the same data block by the host computer system. Consequently, a substantial majority of read data requests actually satisfied from the log device through the read log stream routines 130 will occur on log disks 124, 126 separate from the log disk 122 that maintains the then current first free data segment of the log. As a result, body and tail log disks 124, 126 can be almost exclusively used for data segment read operations. Conversely, the log disk 122 with the current first free segment of the log is substantially shielded by the operation of the buffer cache within the primary memory 16 and, therefore, performs essentially only write data segment operations.

Thus, a log device system providing for an improved utilization of filesystem read and write operational bandwidth has been described. The log device, appearing to the kernel mode operating system core as the original device driver entry points of the main disk device driver transparently hides both the implementation and operation of a log device subsystem independently implemented on an array of log disks. The resulting effectively composite filesystem established by the combined operation of the log device and the native filesystems supported by the main disk device driver not only allows optimization of read and write data operations, but further allows initially established data layout parameters to be dynamically adjusted to maintain optimal independent response to read and write data requests as the relative nature of such requests change with different application program loads and mixes as executed by the host computer system.

Naturally, many modifications and variations of the present invention are possible in light of the above description of the preferred embodiments. However, the modifications and variations that will be readily apparent to those of skill in the art may be practiced without departing from the scope and nature of the present invention as set forth in the appended claims.

We claim:

1. A data storage subsystem coupleable to computer system providing for the storage and retrieval of data with respect to a primary mass storage device as defined in accordance with a filesystem of said computer system, said data storage system comprising:

a) a first mass storage device providing for the storage and retrieval of data with respect to said computer system; and b) a log device driver coupleable to said filesystem of said computer system and said first mass storage device, said log device driver implementing a translation map defined relationship between predetermined data storage portions of said primary mass storage device and said first mass storage device that is transparent to the operation of said filesystem.

2. The data storage subsystem of claim 1 wherein said log device driver internally implements said translation map defined relationship wherein data stored to said first mass storage device preserves an identification of a corresponding predetermined data storage portion of said primary mass storage device.

3. The data storage subsystem of claim 1 wherein said filesystem is operable through a primary device driver to store and retrieve data with respect to predetermined primary addresses within the logical data storage space of said primary mass storage device and wherein said log device driver is coupleable between said filesystem and said primary device driver to provide for the selective transfer of data with respect to said first mass storage device subject to a translation mapping between said predetermined primary addresses and predetermined first addresses within the logical data storage space of said first mass storage device.

4. The data storage subsystem of claim 3 wherein said predetermined first addresses are selectively accessible through said log device driver independent of said filesystem.

5. The data storage subsystem of claim 4 wherein said log device driver provides for the selective storage and retrieval of data from said first mass storage device and said primary mass storage device, said log device driver selectively defining data transfer paths optimized for the writing of data to said first mass storage device and the reading of data from said primary mass storage device.

6. A data storage subsystem for use cooperatively with a computer system including a filesystem and a main device driver coupling said filesystem to a main mass storage disk drive for the storage and retrieval of data identifiable by disk identification and main storage address, said data storage subsystem comprising:

a) a log mass storage disk drive providing for the storage of data in a plurality of segments; and b) a log device driver selectively coupleable between said filesystem and said main device driver, said log device driver providing for the selective construction and storage of a predetermined data block within a predetermined one of said segments from data directed by said filesystem to be stored at a predetermined main storage address, said log device driver providing for the establishment of a translation map relating said predetermined main storage address with said predetermined one of said segments.

7. The data storage subsystem of claim 6 wherein said predetermined one of said segments includes a plurality of data blocks, wherein said predetermined data block is one of said plurality of data blocks within said predetermined one of said segments, and wherein said predetermined main storage address is associated with said predetermined data block as stored by said log mass storage disk drive.

8. The data storage subsystem of claim 7 wherein said log device driver provides support for reordering said predetermined data block within said predetermined one of said segments.

9. The data storage subsystem of claim 8 wherein said log device driver supports reordering as a segment cleaning operation separate from the operation of said filesystem.

10. The data storage subsystem of claim 6 wherein said log device driver selectively directs the routing of data between said filesystem, said main mass storage disk drive, and said log mass storage disk when said log device driver is coupled between said filesystem and said main device driver.

11. The data storage subsystem of claim 6 wherein said log device driver comprises:

a) a command interface coupleable to said operating system;

b) a data interface coupleable between said filesystem and said main device driver; and c) a segment manager selectively coupleable between said data interface and said main device driver, said segment manager providing for the organization of predetermined write data as received by said data interface as a predetermined data block and for organizing a plurality of data blocks including said predetermined data block into a predetermined segment storable as said predetermined one of said segments.

12. The data storage subsystem of claim 11 wherein said segment manager includes:

a) a log cleaner that selectively directs the reading of a trailing one of said plurality of segments from said log disk drive and determines whether to rewrite said trailing one of said plurality of segments to said log disk drive; and b) a log manager that directs the organizing of said plurality of data blocks into said predetermined segment, said log manager being coupled to said log cleaner wherein said plurality of data blocks may be obtained from said trailing one of said plurality of segments.

13. A data storage subsystem providing for the storage and retrieval of data with respect to an operating system including a filesystem executing on a computer system, said data storage system comprising:

a) a main storage device providing for the storage of predetermined data, as provided by said filesystem, at a predetermined main store address within a main filesystem layout in said storage device as managed by said filesystem;

b) a log storage device coupled in a logical data transfer path between said filesystem and said main storage device, said log storage device providing for the storage of said predetermined data within a log structured layout in said log storage device including a plurality of data segment storage locations; and c) a control program executable by said computer system and providing log structured layout management over said log storage device to store said predetermined data in a predetermined data segment with predetermined location data indicative of said predetermined main store address and to further store said predetermined data segment to said log storage device at a predetermined data segment storage location.

14. The data storage subsystem of claim 13 wherein said control program further provides for the reading of said predetermined data segment from said log storage device transparent to the operation of said filesystem and wherein said control program provides for the writing of said predetermined data to said main store device at said predetermined main store address as determinable from said predetermined location data.

15. The data storage subsystem of claim 14 wherein said control program provides for an atomic write of said predetermined data and said predetermined location data to said log storage device.

16. The data storage subsystem of claim 15 wherein said control program selectively provides for the storage of first predetermined data by said log storage device and for the storage of second predetermined data by said main storage device subject to the control of said filesystem, said control program further providing for the transfer of said first predetermined data to said main storage device transparently with respect to the storage of said second predetermined data to said main storage device by said filesystem.

17. The data storage subsystem of claim 16 wherein said control program utilizes a translation map to store said predetermined location data and wherein said control program provides for the writing of said translation map to said log storage device as a translation map data segment.

18. The data storage subsystem of claim 17 wherein said control program provides for at least a predetermined portion of said translation map to be written to said log storage device as part of said predetermined data segment.

19. The data storage subsystem of claim 18 wherein said control program provides for the log ordered reading and writing of data segments, including said translation map data segment and said predetermined data segment, with respect to an ordered set of said plurality of data segment storage locations.

20. A data storage subsystem transparently and selectively providing an optimized write data path for logical data blocks provided by a filesystem of an operating system executable by a computer system that nominally provides for the storage of logical data blocks on a main filesystem disk drive at locations defined by logical data block numbers, said data storage subsystem comprising:

a) log device disk drive providing for the storage of a plurality of data segments, each including a respective plurality of logical data blocks, and wherein said plurality of data segments are stored by said log device disk drive at locations defined by segment numbers; and b) a device driver executable in support of said filesystem to organize a plurality of predetermined logical data blocks into a first predetermined data segment and directing the storage of said predetermined data segment to said log device disk drive, said device driver providing for the construction of a location translation map system relating the logical data block numbers of said predetermined logical data blocks to a first predetermined segment number identifying said first predetermined data segment, said device driver supporting the partitioning of said translation map system into map blocks substitutable as logical data blocks within a second predetermined data segment storable by said log device disk drive.

21. The data storage subsystem of claim 20 wherein said device driver generates and uses said first predetermined segment number independent of said filesystem.

22. The data storage subsystem of claim 21 wherein said device driver provides for the lookup of said predetermined segment number using any of the logical block numbers of said predetermined logical data blocks utilizing said location translation map system.

23. The data storage subsystem of claim 22 wherein said device driver provides for the rewriting of said first predetermined data segment to said log device disk drive at a second predetermined segment number, said device driver providing for the selective substitution of logical data blocks within a first respective plurality of logical data blocks of said first predetermined data segment, wherein selectively substituted logical data blocks of said first respective plurality of logical data blocks are transferable to said filesystem and said main filesystem disk drive.

24. A data storage subsystem providing a write optimized data storage path in a computer system having a main storage device provided to store data blocks at respective main store addresses, said data storage system comprising:

a) a log device providing a log structured storage space for a data segment, said log device being coupleable to the computer system to establish a data transfer path between the computer system and said log device; and b) a control program, executable by said computer system, providing for the processing of a predetermined data block and a corresponding predetermined main store address into a user data block and transfer of said user data block to said log device for storage in said data segment, and further providing for the transfer of said user data block to said computer system to allow storage of said predetermined data block in said main storage device at said corresponding main store address.

25. The data storage subsystem of claim 24 wherein said control program provides for the storage of said user data block in said data segment through an atomic write of said user data block.

26. The data storage subsystem of claim 25 wherein said control program selects between a first data block and a second data block to provide for storage of said first data block, as a first user data block, in said data segment and provides for said second data block to be stored in said main storage device.

27. The data storage subsystem of claim 26 wherein said computer system executes a filesystem to provide for the storage and retrieval of data with respect to said main storage device and wherein said control program operates transparently with respect to said filesystem.

* * * * *